US009230076B2

(12) United States Patent
King et al.

(10) Patent No.: US 9,230,076 B2
(45) Date of Patent: Jan. 5, 2016

(54) MOBILE DEVICE CHILD SHARE

(71) Applicant: Microsoft Corporation, Redmond, WA (US)

(72) Inventors: Joseph Spencer King, Seattle, WA (US); Shawn M. Thomas, Redmond, WA (US); Michael Burt Goulding, Redmond, WA (US); Todd Myles Derksen, Redmond, WA (US); Aaron Naoyoshi Sheung Yan Woo, Seattle, WA (US); Bernardo Iturriaga Dubost, Kirkland, WA (US); Alan Bennett Auerbach, Sammamish, WA (US); David A. Braun, Redmond, WA (US); Andrew P. Begun, Redmond, WA (US); Andrew Craig Haon, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 114 days.

(21) Appl. No.: 13/726,095

(22) Filed: Dec. 22, 2012

(65) Prior Publication Data

US 2014/0068755 A1    Mar. 6, 2014

Related U.S. Application Data

(60) Provisional application No. 61/695,294, filed on Aug. 30, 2012.

(51) Int. Cl.
*G06F 21/31* (2013.01)
*G06F 21/53* (2013.01)
(Continued)

(52) U.S. Cl.
CPC ............... *G06F 21/31* (2013.01); *G06F 21/53* (2013.01); *H04M 1/72577* (2013.01); *H04W 12/08* (2013.01); *G06F 2221/2149* (2013.01); *H04M 1/67* (2013.01); *H04W 88/02* (2013.01)

(58) Field of Classification Search
None
See application file for complete search history.

(56) References Cited

U.S. PATENT DOCUMENTS

| 5,883,598 A | 3/1999 | Parl et al. |
| 6,286,001 B1 | 9/2001 | Walker et al. |

(Continued)

FOREIGN PATENT DOCUMENTS

| CN | 1984402 | 6/2007 |
| CN | 101112072 | 1/2008 |

(Continued)

OTHER PUBLICATIONS

LifeHacker NPL—Pub Feb. 2012—Get the Most Out of Your iPhone's Notification Center, from Beginner to Jailbreaker src: http://lifehacker.com/5882947/get-the-most-out-of-ios-5s-notification-center-from-beginner-to-jailbreaker;obtained date: Jul. 29, 2014.*

(Continued)

*Primary Examiner* — Kaveh Abrishamkar
*Assistant Examiner* — Tri Tran
(74) *Attorney, Agent, or Firm* — Bryan Webster; Judy Kadoura; Micky Minhas

(57) ABSTRACT

In embodiments of mobile device child share, a mobile device can display a default device lock screen on an integrated display device, and receive an input effective to transition from the default device lock screen to display a child lock screen without receiving a PIN code entered on the default device lock screen. The mobile device can receive a second input effective to transition from the child lock screen to display a child space. The mobile device implements a device share service that activates a child share mode of the mobile device, and restricts functionality of device applications and access to device content based on designated restriction limits.

20 Claims, 14 Drawing Sheets

(51) Int. Cl.
    *H04W 12/08*   (2009.01)
    *H04M 1/725*   (2006.01)
    *H04W 88/02*   (2009.01)
    *H04M 1/67*    (2006.01)

(56) References Cited

U.S. PATENT DOCUMENTS

| | | |
|---|---|---|
| 6,339,826 B2 | 1/2002 | Hayes et al. |
| 6,405,033 B1 | 6/2002 | Kennedy et al. |
| 6,446,069 B1 | 9/2002 | Yaung et al. |
| 6,504,480 B1 | 1/2003 | Magnuson et al. |
| 6,519,530 B2 | 2/2003 | Crockett et al. |
| 6,546,002 B1 | 4/2003 | Kim |
| 6,549,768 B1 | 4/2003 | Fraccaroli |
| 6,564,149 B2 | 5/2003 | Lai |
| 6,650,189 B1 | 11/2003 | Romao |
| 6,662,023 B1 | 12/2003 | Helle |
| 6,678,508 B1 | 1/2004 | Koilpillai et al. |
| 6,799,047 B1 | 9/2004 | Bahl et al. |
| 6,847,892 B2 | 1/2005 | Zhou et al. |
| 6,920,455 B1 | 7/2005 | Weschler |
| 6,941,134 B2 | 9/2005 | White |
| 7,058,659 B2 | 6/2006 | Ryu |
| 7,076,797 B2 | 7/2006 | Loveland |
| 7,096,030 B2 | 8/2006 | Huomo |
| 7,142,848 B2 | 11/2006 | Owen et al. |
| 7,161,914 B2 | 1/2007 | Shoaib et al. |
| 7,171,557 B2 | 1/2007 | Kallahalla et al. |
| 7,212,613 B2 | 5/2007 | Kim et al. |
| 7,222,360 B1 | 5/2007 | Miller |
| 7,272,388 B2 | 9/2007 | Andrew et al. |
| 7,274,925 B2 | 9/2007 | Chaar et al. |
| 7,302,272 B2 | 11/2007 | Ackley |
| 7,305,284 B2 | 12/2007 | Teshima et al. |
| 7,308,255 B2 | 12/2007 | Loveland |
| 7,321,774 B1 | 1/2008 | Lau et al. |
| 7,346,921 B2 | 3/2008 | Murren et al. |
| 7,359,713 B1 | 4/2008 | Tiwari |
| 7,366,798 B2 | 4/2008 | Nordstrom et al. |
| 7,408,506 B2 | 8/2008 | Miller |
| 7,471,929 B2 | 12/2008 | Fujioka et al. |
| 7,530,099 B2 | 5/2009 | Flurry et al. |
| 7,634,455 B1 | 12/2009 | Keene et al. |
| 7,657,849 B2 | 2/2010 | Chaudhri et al. |
| 7,668,830 B2 | 2/2010 | Hakala |
| 7,680,882 B2 | 3/2010 | Tiu, Jr. et al. |
| 7,714,778 B2 | 5/2010 | Dupray |
| 7,796,944 B2 | 9/2010 | Eaton et al. |
| 7,809,350 B2 | 10/2010 | Buckley et al. |
| 7,869,792 B1 | 1/2011 | Zhou et al. |
| 7,898,428 B2 | 3/2011 | Dietz et al. |
| 7,958,562 B2 | 6/2011 | Gaucas |
| 7,961,651 B2 | 6/2011 | Kim et al. |
| 8,046,839 B2 | 10/2011 | Lo |
| 8,244,272 B2 | 8/2012 | Morgan et al. |
| 8,275,352 B2 | 9/2012 | Forstall et al. |
| 8,311,730 B2 | 11/2012 | Neff |
| 8,385,039 B2 | 2/2013 | Rothkopf |
| 8,437,779 B2 | 5/2013 | Phukan |
| 8,549,657 B2 | 10/2013 | Karlson et al. |
| 8,565,820 B2 | 10/2013 | Riemer et al. |
| 8,657,743 B2 | 2/2014 | Rietzel et al. |
| 8,706,172 B2 | 4/2014 | Priyantha et al. |
| 8,874,162 B2 | 10/2014 | Schrader et al. |
| 8,907,772 B1 | 12/2014 | Green et al. |
| 8,918,119 B2 | 12/2014 | Kim et al. |
| 9,027,117 B2 | 5/2015 | Wilairat et al. |
| 9,066,234 B2 | 6/2015 | Karlson et al. |
| 2001/0039587 A1 | 11/2001 | Uhler et al. |
| 2002/0044149 A1 | 4/2002 | McCarthy et al. |
| 2003/0003907 A1 | 1/2003 | Lai et al. |
| 2003/0139192 A1 | 7/2003 | Chmaytelli et al. |
| 2003/0187803 A1 | 10/2003 | Pitt |
| 2004/0007916 A1 | 1/2004 | Awada et al. |
| 2004/0015940 A1 | 1/2004 | Heisey et al. |
| 2004/0039909 A1 | 2/2004 | Cheng |
| 2004/0166878 A1 | 8/2004 | Erskine et al. |
| 2004/0192352 A1 | 9/2004 | Vallstrom et al. |
| 2004/0203576 A1* | 10/2004 | Droste et al. ............. 455/404.1 |
| 2005/0012640 A1 | 1/2005 | Kong et al. |
| 2005/0037775 A1 | 2/2005 | Moeglein et al. |
| 2005/0055567 A1 | 3/2005 | Libin et al. |
| 2005/0070276 A1 | 3/2005 | McGarry |
| 2005/0107114 A1 | 5/2005 | Ocock et al. |
| 2005/0138110 A1 | 6/2005 | Redlich et al. |
| 2005/0143171 A1 | 6/2005 | Loose |
| 2005/0210104 A1 | 9/2005 | Torvinen |
| 2005/0222768 A1 | 10/2005 | Tauchi et al. |
| 2006/0046706 A1 | 3/2006 | Lin et al. |
| 2006/0053389 A1 | 3/2006 | Michelman |
| 2006/0099969 A1 | 5/2006 | Staton et al. |
| 2006/0136998 A1 | 6/2006 | Oowaki et al. |
| 2006/0246872 A1 | 11/2006 | Tarkkala |
| 2006/0253570 A1 | 11/2006 | Biswas et al. |
| 2006/0256005 A1 | 11/2006 | Thandu et al. |
| 2006/0271797 A1 | 11/2006 | Ginggen et al. |
| 2006/0293057 A1 | 12/2006 | Mazerski et al. |
| 2007/0006327 A1 | 1/2007 | Lal et al. |
| 2007/0028176 A1 | 2/2007 | Perdomo et al. |
| 2007/0032225 A1 | 2/2007 | Konicek et al. |
| 2007/0042790 A1 | 2/2007 | Mohi et al. |
| 2007/0046423 A1 | 3/2007 | Baucom |
| 2007/0046456 A1 | 3/2007 | Edwards et al. |
| 2007/0064882 A1 | 3/2007 | Ger et al. |
| 2007/0067655 A1 | 3/2007 | Shuster |
| 2007/0072616 A1 | 3/2007 | Irani |
| 2007/0082707 A1 | 4/2007 | Flynt et al. |
| 2007/0091037 A1 | 4/2007 | Lee |
| 2007/0111726 A1 | 5/2007 | Lanbert et al. |
| 2007/0150826 A1 | 6/2007 | Anzures et al. |
| 2007/0150842 A1 | 6/2007 | Chaudhri et al. |
| 2007/0180509 A1 | 8/2007 | Swartz et al. |
| 2007/0218938 A1 | 9/2007 | Carter |
| 2007/0245398 A1 | 10/2007 | Roden |
| 2007/0264981 A1 | 11/2007 | Miller |
| 2007/0300140 A1 | 12/2007 | Makela et al. |
| 2008/0014964 A1 | 1/2008 | Sudit et al. |
| 2008/0020803 A1 | 1/2008 | Rios et al. |
| 2008/0032703 A1 | 2/2008 | Krumm et al. |
| 2008/0051079 A1 | 2/2008 | Forsgren |
| 2008/0080688 A1 | 4/2008 | Burgan et al. |
| 2008/0082693 A1 | 4/2008 | Meijer et al. |
| 2008/0101658 A1 | 5/2008 | Ahern et al. |
| 2008/0111698 A1 | 5/2008 | Atherton |
| 2008/0154780 A1 | 6/2008 | Soukup et al. |
| 2008/0254767 A1 | 10/2008 | Jin |
| 2008/0268870 A1 | 10/2008 | Houri |
| 2008/0305808 A1 | 12/2008 | Chan et al. |
| 2008/0318595 A1 | 12/2008 | Rofougaran |
| 2009/0005061 A1 | 1/2009 | Ward et al. |
| 2009/0005080 A1 | 1/2009 | Forstall et al. |
| 2009/0006566 A1 | 1/2009 | Veeramachaneni et al. |
| 2009/0006991 A1 | 1/2009 | Lindberg et al. |
| 2009/0045927 A1 | 2/2009 | Atella |
| 2009/0089886 A1 | 4/2009 | Cheng et al. |
| 2009/0093688 A1 | 4/2009 | Mathur |
| 2009/0116703 A1 | 5/2009 | Schultz |
| 2009/0119590 A1 | 5/2009 | Kondziela et al. |
| 2009/0157560 A1 | 6/2009 | Carter et al. |
| 2009/0158389 A1 | 6/2009 | Waltenberg et al. |
| 2009/0170532 A1 | 7/2009 | Lee et al. |
| 2009/0201896 A1 | 8/2009 | Davis et al. |
| 2009/0205041 A1 | 8/2009 | Michalske |
| 2009/0224931 A1 | 9/2009 | Dietz et al. |
| 2009/0265794 A1 | 10/2009 | Apelqvist |
| 2009/0278738 A1 | 11/2009 | Gopinath |
| 2009/0282473 A1 | 11/2009 | Karlson et al. |
| 2010/0001967 A1 | 1/2010 | Yoo |
| 2010/0020035 A1 | 1/2010 | Ryu et al. |
| 2010/0056124 A1 | 3/2010 | Keating et al. |
| 2010/0066821 A1 | 3/2010 | Rosener et al. |
| 2010/0074450 A1 | 3/2010 | Liao |
| 2010/0115610 A1 | 5/2010 | Tredoux et al. |
| 2010/0127836 A1 | 5/2010 | Huang et al. |

(56) References Cited

U.S. PATENT DOCUMENTS

| | | |
|---|---|---|
| 2010/0134310 A1 | 6/2010 | Zheng et al. |
| 2010/0162180 A1 | 6/2010 | Dunnam et al. |
| 2010/0167714 A1 | 7/2010 | Howarter et al. |
| 2010/0190479 A1 | 7/2010 | Scott et al. |
| 2010/0210301 A1 | 8/2010 | Dietz et al. |
| 2010/0216509 A1 | 8/2010 | Riemer et al. |
| 2010/0227588 A1 | 9/2010 | Bradley |
| 2010/0253503 A1 | 10/2010 | Juang |
| 2010/0255856 A1 | 10/2010 | Kansal et al. |
| 2010/0268779 A1 | 10/2010 | Rao |
| 2010/0285815 A1 | 11/2010 | Treu et al. |
| 2010/0302028 A1 | 12/2010 | Desai et al. |
| 2010/0306832 A1 | 12/2010 | Mu et al. |
| 2010/0311336 A1 | 12/2010 | Huotari et al. |
| 2010/0313050 A1 | 12/2010 | Harrat et al. |
| 2010/0321155 A1 | 12/2010 | Ballard |
| 2010/0324819 A1 | 12/2010 | Nurminen et al. |
| 2011/0010340 A1 | 1/2011 | Hung et al. |
| 2011/0021213 A1 | 1/2011 | Carr |
| 2011/0021234 A1 | 1/2011 | Tibbitts et al. |
| 2011/0047484 A1 | 2/2011 | Mount et al. |
| 2011/0063098 A1 | 3/2011 | Fischer et al. |
| 2011/0065419 A1 | 3/2011 | Book et al. |
| 2011/0070829 A1 | 3/2011 | Griffin et al. |
| 2011/0093161 A1 | 4/2011 | Zhou et al. |
| 2011/0111728 A1 | 5/2011 | Ferguson et al. |
| 2011/0167342 A1 | 7/2011 | De La Pena et al. |
| 2011/0167344 A1 | 7/2011 | Pan |
| 2011/0169654 A1 | 7/2011 | Ketari |
| 2011/0171958 A1 | 7/2011 | Hua et al. |
| 2011/0197160 A1 | 8/2011 | Kim et al. |
| 2011/0215903 A1 | 9/2011 | Yang et al. |
| 2011/0215952 A1 | 9/2011 | Aria et al. |
| 2011/0237221 A1 | 9/2011 | Prakash et al. |
| 2011/0241827 A1 | 10/2011 | Varoglu |
| 2011/0244837 A1 | 10/2011 | Murata et al. |
| 2011/0247045 A1 | 10/2011 | Rajagopal et al. |
| 2011/0250840 A1 | 10/2011 | Lee et al. |
| 2011/0254792 A1 | 10/2011 | Waters et al. |
| 2011/0264246 A1 | 10/2011 | Pantoja et al. |
| 2011/0267171 A1 | 11/2011 | Li et al. |
| 2011/0275321 A1 | 11/2011 | Zhou et al. |
| 2011/0276901 A1 | 11/2011 | Zambetti |
| 2011/0283185 A1 | 11/2011 | Obasanjo et al. |
| 2011/0283241 A1 | 11/2011 | Miller et al. |
| 2011/0283311 A1 | 11/2011 | Luong |
| 2011/0299422 A1 | 12/2011 | Kim et al. |
| 2011/0307166 A1 | 12/2011 | Hiestermann et al. |
| 2011/0319051 A1 | 12/2011 | Reitnour |
| 2011/0319094 A1 | 12/2011 | Usui et al. |
| 2012/0023573 A1 | 1/2012 | Shi |
| 2012/0046020 A1 | 2/2012 | Tomasini |
| 2012/0084691 A1 | 4/2012 | Yun |
| 2012/0084734 A1 | 4/2012 | Wilairat |
| 2012/0084737 A1 | 4/2012 | Gimpl et al. |
| 2012/0098768 A1 | 4/2012 | Bendewald et al. |
| 2012/0100895 A1 | 4/2012 | Priyantha et al. |
| 2012/0115512 A1 | 5/2012 | Grainger et al. |
| 2012/0144468 A1 | 6/2012 | Pratt et al. |
| 2012/0146850 A1 | 6/2012 | Liu |
| 2012/0234058 A1 | 9/2012 | Neil et al. |
| 2012/0242906 A1 | 9/2012 | Shintani et al. |
| 2012/0244883 A1 | 9/2012 | Tibbitts et al. |
| 2012/0245838 A1 | 9/2012 | Van Doorselaer |
| 2012/0268249 A1 | 10/2012 | Kansal et al. |
| 2012/0282887 A1 | 11/2012 | Khoo et al. |
| 2012/0289217 A1 | 11/2012 | Riemer et al. |
| 2012/0306637 A1 | 12/2012 | McGough et al. |
| 2012/0317162 A1 | 12/2012 | Endsley et al. |
| 2013/0006469 A1 | 1/2013 | Green et al. |
| 2013/0023246 A9 | 1/2013 | Ellingham et al. |
| 2013/0031601 A1 | 1/2013 | Bott |
| 2013/0036211 A1 | 2/2013 | Messer et al. |
| 2013/0040629 A1 | 2/2013 | Sprigg et al. |
| 2013/0040711 A1* | 2/2013 | Kim et al. ............ 455/575.1 |
| 2013/0072172 A1 | 3/2013 | Chang et al. |
| 2013/0084847 A1 | 4/2013 | Tibbitts et al. |
| 2013/0130742 A1 | 5/2013 | Dietz et al. |
| 2013/0188503 A1 | 7/2013 | Anepu et al. |
| 2013/0225151 A1 | 8/2013 | King et al. |
| 2013/0225152 A1 | 8/2013 | Matthews, III et al. |
| 2013/0227431 A1 | 8/2013 | Vasudevan et al. |
| 2013/0295872 A1 | 11/2013 | Guday et al. |
| 2013/0295913 A1 | 11/2013 | Matthews, III et al. |
| 2013/0298037 A1 | 11/2013 | Matthews, III et al. |
| 2013/0303143 A1 | 11/2013 | Schrader |
| 2013/0305319 A1 | 11/2013 | Matthews |
| 2013/0305354 A1 | 11/2013 | King et al. |
| 2015/0011203 A1 | 1/2015 | Schrader et al. |

FOREIGN PATENT DOCUMENTS

| | | |
|---|---|---|
| CN | 101778165 | 7/2010 |
| CN | 101828162 | 9/2010 |
| EP | 2169946 | 3/2010 |
| EP | 2293016 | 3/2011 |
| EP | 2369864 | 9/2011 |
| EP | 2469442 A1 | 6/2012 |
| JP | 07203015 | 8/1995 |
| JP | 2002142010 | 5/2002 |
| JP | 2002530783 | 9/2002 |
| JP | 2003032353 | 1/2003 |
| JP | 2007257140 | 10/2007 |
| JP | 2009521753 | 6/2009 |
| JP | 2010503082 | 1/2010 |
| KR | 20050037613 | 4/2005 |
| KR | 20100083396 | 7/2010 |
| KR | 20110093528 | 8/2011 |
| WO | WO-2005031544 | 4/2005 |
| WO | WO-2006088273 | 8/2006 |
| WO | WO-2006099535 | 9/2006 |
| WO | WO-2007130123 | 11/2007 |
| WO | WO-2009105666 | 8/2009 |
| WO | WO-2011135359 | 11/2011 |
| WO | WO-2012047412 | 4/2012 |
| WO | WO-2013061156 | 5/2013 |

OTHER PUBLICATIONS

OSXDaily NPL—Pub Mar. 2012—using IOS 5.1 in iPhone src:http://osxdaily.com/2012/03/08/lock-screen-camera-ios-5-1; obtinaed date:Jul. 29, 2014.*

WikiPedia NPL—Windows TimeLine; obtained from WikiPedia.com on Dec. 14, 2014.*

HowToGeek 2009 NPL—Restrict applications with AppLocker: Obatined from: http://www.howtogeek.com/howto/6317/block-users-from-using-certain-applications-with-applocker/ on Dec. 13, 2014.*

Superuser.con NPL 2011—List of users in login screen; scr: http://superuser.com/questions/354856/how-can-i-see-a-list-of-all-users-on-the-logon-screen; obtained date: Dec. 4, 2014.*

"International Search Report and Written Opinion", Application No. PCT/US2013/050963, Nov. 8, 2013, 14 pages.

"Non-Final Office Action", U.S. Appl. No. 12/417,752, Oct. 29, 2013, 16 Pages.

"Non-Final Office Action", U.S. Appl. No. 12/417,752, Feb. 25, 2014, 22 pages.

"Notice of Allowance", U.S. Appl. No. 12/912,456, Jan. 7, 2014, 9 Pages.

"BroadCloud FamilyCenter", BroadSoft Data Sheet—retrieved from <http://www.broadsoft.com/pdf/datasheet-broadcloud-familycenter.pdf> on Dec. 13, 2011, 1 page.

"Distracted Driving Information Clearinghouse", Retrieved from <http://www.fcc.gov/encyclopedia/distracted-driving-information-clearinghouse>, Jul. 27, 2011, 4 pages.

"Final Office Action", U.S. Appl. No. 13/222,538, May 28, 2013, 43 pages.

"Final Office Action", U.S. Appl. No. 13/875,139, May 9, 2014, 15 Pages.

"Foreign Notice of Allowance", CN Application No. 200980128048.8, Jun. 28, 2014, 6 Pages.

(56) References Cited

OTHER PUBLICATIONS

"Foreign Office Action", AU Application No. 2011312743, Jun. 20, 2014, 4 Pages.
"Foreign Office Action", CN Application No. 200980128048.8, Dec. 2, 2013, 7 pages.
"Foreign Office Action", CN Application No. 201110317851.5, Dec. 4, 2013, 14 pages.
"Foreign Office Action", CN Application No. 201110317851.5, May 8, 2014, 10 Pages.
"Foreign Office Action", EP Application No. 11831134.9, May 9, 2014, 3 Pages.
"iCloud: What You Need to Know", MacWorld.com—retrieved from <http://www.macworld.com/article/160380/2011/06/icloud_what_you_need_to_know.html> on Dec. 13, 2011, Jun. 8, 2011, 16 pages.
"International Search Report and Written Opinion", Application No. PCT/US2012/071559, Mar. 28, 2013, 10 pages.
"International Search Report and Written Opinion", Application No. PCT/US2012/071546, Apr. 29, 2013, 10 pages.
"International Search Report and Written Opinion", Application No. PCT/US2011/049614, Mar. 26, 2012, 7 pages.
"International Search Report and Written Opinion", Application No. PCT/US2012/071545, Mar. 28, 2013, 9 pages.
"International Search Report and Written Opinion", Application No. PCT/US2012/071555, Apr. 25, 2013, 9 pages.
"Mobile Task Tracker Screen Shots", Retrieved from <http://www.mobiletasktracker.com/Screen%20Shots.html>, Jul. 13, 2011, 4 Pages.
"Non-Final Office Action", U.S. Appl. No. 12/897,586, May 8, 2014, 12 pages.
"Non-Final Office Action", U.S. Appl. No. 13/090,474, May 6, 2014, 12 pages.
"Non-Final Office Action", U.S. Appl. No. 13/222,538, Oct. 11, 2013, 38 pages.
"Non-Final Office Action", U.S. Appl. No. 13/328,312, Aug. 6, 2013, 18 pages.
"Non-Final Office Action", U.S. Appl. No. 13/875,139, Oct. 3, 2013, 12 pages.
"Notice of Allowance", U.S. Appl. No. 13/726,097, Jun. 10, 2014, 7 pages.
"Parental Control Software for Cell Phones", retrieved from <http://www.parentalcontrolcellphones.com/> on Dec. 8, 2011, Apr. 30, 2010, 5 pages.
"Restriction Requirement", U.S. Appl. No. 13/726,097, Mar. 21, 2014, 7 pages.
"Safe Driving System", Retrieved from <http://web.archive.org/web/20100512220953/http://key2safedriving.com/>, May 12, 2010, 2 pages.
"Supplementary Search Report", EP Application No. 11831134.9, Apr. 3, 2014, 3 pages.
"Welcome to Sprint Drive First", Retrieved at <<https://drivefirst.sprint.com/welcome.htm>> on Nov. 20, 2013, 2 pages.
"Your Very Own Support Geek", retrieved from <http://yoursupportgeek.info/miscellaneous-geek-stuff/t-mobile-uk-to-offer-icd-vega-15-inch-tegra-android-tablet-in-2010> on Dec. 13, 2011, Jan. 7, 2010, 2 pages.
Bilderbeek, "From Unified to Social Communications and Collaboration", retrieved from <http://www.themetisfiles.com/2011/10/from-unified-to-social-communications-and-collaboration/> on Dec. 13, 2011, Oct. 25, 2011, 4 pages.
Cui, "Facilitating Consumption of Online Social Networking Services on Mobile Devices", Proceedings of the 13th international conference on Ubiquitous Computing, Sep. 17, 2011, 4 Pages.
Davies, "T-Mobile UK to Offer ICD Vega 15-inch Tegra Android Tablet in 2010", Retrieved from <http://www.slashgear.com/t-mobile-uk-to-offer-icd-vega-15-inch-tegra-android-tablet-in-2010-0768671/> on Mar. 11, 2013, Jan. 7, 2010, 7 pages.
Dipane, "Sprint to Bring Parental Locks to Android Phones to Prevent Use While Driving", retrieved from <http://www.androidcentral.com/sprint-bring-parental-locks-android-phones-prevent-use-while-driving> on Dec. 8, 2011, Mar. 22, 2011, 7 pages.
Kharif, "Parental Controls for Mobile Phones? You Bet", Tech Beat, retrieved from <http://www.businessweek.com/the_thread/techbeat/archives/2005/08/parental_contro.html> on Dec. 8, 2011, Aug. 16, 2005, 12 pages.
Leblanc, "The Device Experience in Windows 7—Updated", Windows 7 Team Blog, retrieved from <http://windowsteamblog.com/windows/archive/b/windows7/archive/2009/09/01/the-device-experience-in-windows-7-updated.aspx> on Dec. 13, 2011, Sep. 1, 2009, 14 pages.
Moran, et al.,' "Getting Started with Windows 7", 2009, 412 pages.
"The Lifesaving Smartphone Feature That We Need: Driving Mode", Retrieved from <http://www.forbes.com/sites/chunkamui/2011/12/19/the-smart-phone-feature-that-we-need-driving-mode/>, Dec. 19, 2011, 4 pages.
Nasar, et al.,' "Mobile Telephones, Distracted Attention, and Pedestrian Safety", Accident Analysis & Prevention, retrieved from <http://facweb.knowlton.ohiostate.edu/jnasar/crpinfo/research/MobilePhones_AAP_2007.pdf> on Dec. 8, 2011, Jan. 2008, pp. 69-75.
Niino, "There was free enterprise microblogging, Japanese were developed "youRoom!"Free plan upgrade just mutter", Retrieved from <http://www.publickey1.jp/blog/10/youroom.html>, Dec. 21, 2010, 4 Pages.
Patten, et al.,' "Using Mobile Telephones: Cognitive Workload and Attention Resource Allocation", Accident Analysis and Prevention, retrieved from <http://beta.nsc.org/safety_road/Distracted_Driving/Documents/Using%20mobile%20telephones,%20cognitive%20workload%20and%20attention%20resource%20allocation.pdf> on Dec. 8, 2011, May 2004, pp. 341-350.
Saenz "Unlock Your Door with Your Phone, Text a Key to a Friend—Lockitron is Awesome (video)", Retrieved from: <http://singularityhub.com/2011/05/24/unlock-yourdoor-with-your-phone-text-a-key-to-a-friend-lockitron-is-awesome-video/> on Feb. 10, 2012, May 24, 2011, 4 pages.
Samberg, "Stay Focused While Driving", Retrieved from <<http://www.verizonwireless.com/news/2012/09/safely-go-driving-app.html>> on Nov. 20, 2013, Sep. 13, 2012, 5 pages.
Tiemann, "AT&T Adds Parental Control Options to Cell Phones", CNET News—retrieved from <http://news.cnet.com/8301-13507_3-9770506-18.html> on Dec. 8, 2011, Sep. 7, 2007, 1 pages.
Warren, "Microsoft Flaunts Metro Style PowerPoint Live Tiles", WinRumors—retrieved from <http://www.winrumors.com/microsoft-flaunts-metro-style-powerpoint-live-tiles-video/> on Dec. 13, 2011, Jul. 11, 2011, 12 pages.
Williams, "AT&T Drive Mode, the Anti-Texting While Driving Mobile Solution (video)", Retrieved from <http://www.talkandroid.com/66579-att-drive-mode-the-anti-texting-while-driving-mobile-solution-video/>, Oct. 13, 2011, 6 pages.
Wood, "Hey, Phone Makers: Where's 'Driving Mode'?", Retrieved from <http://news.cnet.com/8301-31322_3-20003824-256.html>, Apr. 29, 2010, 3 pages.
"Final Office Action", U.S. Appl. No. 12/417,752, (Jul. 17, 2013),18 pages.
"Final Office Action", U.S. Appl. No. 12/912,456, (Sep. 6, 2013), 22 pages.
"Final Office Action", U.S. Appl. No. 13/090,474, (Nov. 21, 2013), 12 pages.
"Non-Final Office Action", U.S. Appl. No. 12/417,752, (May 24, 2013),17 pages.
"Non-Final Office Action", U.S. Appl. No. 13/090,474, (Apr. 26, 2013),11 pages.
Branscombe, Mary "Kids Corner and Wallet", Retrieved from <http://www.techradar.com/reviews/pc-mac/software/operating-systems/windows-phone-8-1086692/review/6>, (Jan. 25, 2012), 7 pages.
"EP Search Report", EP Application No. 09747072.8, Jan. 17, 2003, 5 Pages.
"Final Office Action", U.S. Appl. No. 12/194,213, Sep. 20, 2011, 11 Pages.
"Final Office Action", U.S. Appl. No. 12/417,752, Feb. 25, 2014, 22 Pages.

(56) References Cited

OTHER PUBLICATIONS

"Foreign Office Action", CN Application No. 200980128048.8, May 6, 2013, 7 Pages.

"Foreign Office Action", CN Application No. 200980128048.8, Dec. 19, 2012, 11 Pages.

"International Search Report and Written Opinion", Application No. PCT/US2009/039509, Nov. 18, 2009, 8 Pages.

"International Search Report and Written Opinion", Application No. PCT/US2012/071557, Mar. 28, 2013, 9 pages.

"iPad Parental Control (restricting app access)", iPad Reviews, Jailbreak Guides; last retrieved from http://ipaded.net/ipad/parental-control/ on Feb. 29, 2012, 5 pages.

"No Tech Panacea for Tech-Distracted Driving", http://mobile.slashdot.org/story/12/06/11/0556231/no-tech-panacea-for . . . , Dec. 6, 2011, 30 Pages.

"Non Final Office Action", U.S. Appl. No. 13/222,538, Feb. 14, 2013, 33 Pages.

"Non-Final Office Action", U.S. Appl. No. 12/194,213, Mar. 17, 2011, 11 Pages.

"Non-Final Office Action", U.S. Appl. No. 13/726,099, Mar. 18, 2014, 8 pages.

"Notice of Allowance", U.S. Appl. No. 12/194,213, May 31, 2013, 11 Pages.

"Notice of Allowance", U.S. Appl. No. 12/194,213, Jun. 27, 2012, 16 Pages.

"Notice of Allowance", U.S. Appl. No. 12/194,213, Dec. 21, 2012, 13 Pages.

"Restrict Access to Applications using AppLocker", Retrieved from: <http://www.dq.winsila.com/tips-tricks/restrict-access-to-applications-using-applocker.html> on Feb. 13, 2012, Jan. 5, 2012, 2 pages.

"Setting Up Simple Restricted Access", Retrieved at: http://support.webvanta.com/support_article/615777-setting-up-simple-restricted-access-on Feb. 29, 2012, 3 Pages.

Aventail, et al.,' "Aventail and Trust Digital Launch Integrated Secure Mobile Access Solution", http://findarticles.com/p/articles/mi_pwwi/is_200602/ai_n16063742/?tag=content;col1, Last accessed May 14, 2008, Feb. 2006, 3 Pages.

Campbell, et al.,' "Biometrically Enhanced Software-Defined Radios", Proc. Software Defined Radio Technical Conf, Orlando, Florida, Nov. 2003, 6 Pages.

Covington, et al.,' "Parameterized Authentication", Proc. 9th European Symposium on Research Computer Security, Lecture notes in Computer Science, Sep. 2004, 18 Pages.

Hoffmann, et al.,' "Multilateral Security in Mobile Applications and Location Based Services", https://users.cs.jmu.edu/bernstdh/web/CS685/papers/hoffman-et-al-2002.pdf, Last accessed May 14, 2008,2002, 18 Pages.

Jagadeesan, et al.,' "A Novel Approach to Design of User Re-Authentication Systems", Proc. 3rd IEEE Intl. Conf. on Biometrics: Theory, Applications and Systems, Sep. 2009, 6 Pages.

King, et al.,' "Mobile Device Child Share", U.S. Appl. No. 13/726,095, Mar. 21, 2013, 57 Pages.

Klosterman, et al.,' "Secure Continuous Biometric-Enhanced Authentication", Technical Report, May 2000, May 2000, 25 Pages.

Kottahachchi, et al.,' "Access Controls for Intelligent Environments", In: Proceedings of ISDA '04: 4th Annual International Conference on Intelligent Systems Design and Applications. Budapest, Hungary (2004), 2004, 6 Pages.

Liu, et al.,' "xShare: Supporting Impromptu Sharing of Mobile Phones", In Proceedings of the 7th international conference on Mobile systems, applications, and services, Jun. 22, 2009, pp. 15-28.

McGlaun, "Fixes for Distracted Driving Remain Unclear", http://www.dailytech.com/article.aspx?newsid=24903, Jun. 12, 2012, 2 Pages.

Quick, "BizzTrust for Android splits a single smartphone into two virtual phones", http://www.gizmag.com/bizztrust-for-android/20114/, Retrieved on Jan. 10, 2012,Oct. 2011, 4 Pages.

Simonite, "One Smart Phone, Two Personalities", http://www.technologyreview.com/communications/38865/, Retrieved Jan. 10, 2012,Oct. 13, 2011, 3 Pages.

Stajano, "One user, many hats; and, sometimes, no hat? towards a secure yet usable pda", Security Protocols Workshop, Springer Verlag, 2004, 14 Pages.

Talbot, "App Battles Driver Distraction but Spares Passengers", Technology Review India published by MIT, http://www.technologyreview.in/news/426889/app-battles-driver-distraction-but-spares-passengers,Feb. 14, 2012, 2 pages.

Temporale, "Removing Application Lock on Windows Mobile Standard Devices", http://www.mobilejaw.com/articles/2009/09/removing-application-lock-on-windows-mobile-standard-devices/, Retrieved on Oct. 13, 2011,Sep. 4, 2009, 10 Pages.

Weilenmann, et al.,' "Local Use and Sharing of Mobile Phones", In B. Brown, N. Green & R. Harper (Eds.) Wireless World: Social and Interactional Aspects of the Mobile Age. Godalming and Hiedleburg: Springer Verlag, 2001, pp. 99-115.

Zaplata, "Context-based Cooperation in Mobile Business Environments—Managing the Distributed Execution of Mobile Processes", Business & Information Systems Engineering, Apr. 2009, pp. 301-314.

"Final Office Action", U.S. Appl. No. 12/417,752, (Sep. 13, 2012),18 pages.

"Final Office Action", U.S. Appl. No. 12/912,456, (Jan. 9, 2013),21 pages.

"Ignite Where & Launch Pad", *O'Reilly, Where 2.0 Conference 2008*, retrieved from <http://en.oreilly.com/where2008/public/schedule/detail/2572> on Feb. 5, 2009,(May 2008), 4 pages.

"Non Final Office Action", U.S. Appl. No. 12/417,752, (Jun. 28, 2011),14 pages.

"Non-Final Office Action", U.S. Appl. No. 12/912,456, (May 4, 2012),14 pages.

"Non-Final Office Action", U.S. Appl. No. 12/912,456, (Sep. 11, 2012),15 pages.

"PCT Search Report and Written Opinion", Application No. PCT/US2012/034598, (Oct. 12, 2012), 9 pages.

"What's an Android? And Other Smart (phone) Questions", Retrieved from: <http://bestbuybusinessdistrict.com/knowlege-center/58-what%27s-an-android-and-other-smart-phone-questions> on Feb. 7, 2011, (Sep. 6, 2010), 4 pages.

Aalto, Lauri et al., "Bluetooth and WAP Push Based Location-Aware Mobile Advertising System", *ACM, MobiSYS '04*, Jun. 6-9, 2004, Boston, MA, retrieved from <http://www.mediateam.oulu.fi/publications/pdf/496.pdf> on Feb. 5, 2009,(Jun. 6, 2004),10 pages.

Abdelzaher, et al., "Mobiscopes for Human Spaces", *IEEE Pervasive Computing*, vol. 6, No. 2, (Apr. 2007),11 pages.

Abdesslem, et al., "Less is More: Energy-Efficient Mobile Sensing with SenseLess", *MobiHeld an ACM SIGCOMM workshop*, (Aug. 17, 2009), pp. 61-62.

Agarwal, Yuvraj et al., "Somniloquy: Augmenting Network Interfaces to Reduce PC Energy Usage", *Symposium on Networked Systems Design and Implementation (NSDI)*, 2009, available at <http://www.usenix.org/events/nsdi09/tech/full_papers/agarwal/agarwal.pdf>,(Apr. 23, 2009), pp. 365-380.

Azizyan, Martin et al., "SurroundSense: Mobile Phone Localization Using Ambient Sound and Light", retrieved from <http://synrg.ee.duke.edu/papers/surroundsense-poster.pdf> on Feb. 5, 2009,(Sep. 22, 208),1 page.

Bahl, Paramvir et al., "RADAR: An In-Building RF-based User Location and Tracking System", *Microsoft Research, Proceedings of IEEE Infocom 2000*, Tel-Aviv, Israel, retrieved from <https://3research.microsoft.com/en-us/um/people/padmanab/papers/infocom2000.pdf> on Feb. 5, 2009,(Mar. 2000),10 pages.

Balakrishnan, Hari et al., "ITR: Scalable Location-Aware Monitoring (SLAM) Systems", *Laboratory for Computer Science & Department of EECS, MIT*, Cambridge, MA, retrieved from <http://nms.lcs.mit.edu/projects/slam/prop.pdf> on Feb. 5, 2009,(Nov. 9, 2001), 31 pages.

Barroso, et al., "The Case for Energy-Proportional Computing", *IEEE Computer Society*, vol. 40. No. 12, (Dec. 2007), pp. 33-37.

Burke, et al., "Participatory Sensing", *WSW at SenSys*, (Oct. 31, 2006),5 pages.

Chiu, et al., "Playful Bottle: A Mobile Social Persuasion System to Motivate Healthy Water Intake", *Proceedings of the 11th international conference on Ubiquitous computing*, (2009),10 pages.

(56) References Cited

OTHER PUBLICATIONS

Consolvo, "Folwers or a Robot Army?: Encouraging Awareness & Activity with Personal, Mobile Displays", *Proceedings of the 10th International Conference on Ubiquitous Computing*, vol. 12, No. 4, Publisher: ACM Press, (Sep. 2008),10 pages.

Constandache, et al., "Energy-Aware Localization Using Mobile Phones", retrieved from <http://www.cs.duke.edu/~ionut/2008_mobisys.pdf> on Feb. 5, 2009,(Jun. 2008),1 page.

Constandache, Ionut et al., "Energy-effcient Localization Via Personal Mobility Profiling", *In Proceedings of MobiCASE 2009*, Available at <http://synrg.ee.duke.edu/papers/mobicase09.pdf>,(Oct. 2009), pp. 1-20.

Flinn, Jason "Extending Mobile Computer Battery Life through Energy-Aware Adaptation", *School of Computer Science, Carnegie Mellon University*, Pittsburgh, PA, retrieved from <http://reports-archive.adm.cs.cmu.edu/anon/2001/CMU-CS-01-171.pdf> Feb. 5, 2009,(Dec. 2001),165 pages.

Foster, et al., "Precision and accuracy of an ankle-worn accelerometer-based pedometer in step counting and", *Preventive Medicine*, vol. 41, No. 3-4, (Oct. 2005), pp. 778-783.

Gaonkar, Shravan et al., "Micro-Blog: Sharing and Querying Content through Mobile Phones and Social Participation", *ACM, MobiSys 2008*, Jun. 17-20, 2008, Breckenridge, CO, retrieved from <http://www.cs.duke.edu/~lpcox/romit-microblog.pdf> on Feb. 5, 2009,(Jun. 17, 2008),13 pages.

Hoh, et al., "Virtual Trip Lines for Distributed Privacy-Preserving Traffic Monitoring", *Proceedings of the 6th International Conference on Mobile Systems, Applications, and Services*, (Jun. 2008),14 pages.

Hull, et al., "CarTel: A Distributed Mobile Sensor Computing System", *Proceedings of the 4th international conference on Embedded networked sensor systems*, (Nov. 2006), 14 pages.

Kang, et al., "A Scalable and Energy-Efficient Context Monitoring Framework for Mobile Personal Sensor Networks", *IEEE Transactions on Mobile Computing*, vol. 9, No. 5, (May 2010), pp. 686-702.

Kansal, Aman et al., "Location and Mobility in a Sensor Network of Mobile Phones", *Microsoft Research, Microsoft Corporation*, retrieved from <http://research.microsoft.com.com/apps/pubs/default.aspx?id=70416> Feb. 5, 2009,(Jun. 4, 2007),1 pages.

Krumm, John et al., "Predestination: Inferring Destinations from Partial Trajectories", *UbiComp 2006: The Eighth International Conference on Ubiquitous Computing*, Sep. 17-21, 2006, Orange County, CA, retrieved from <http://research.microsoft.com/en-us/um/people/horvitzlpredestination.pdf> on Feb. 5, 2009,(Sep. 17, 2006),18 pages.

Krumm, John et al., "RightSPOT: A Novel Sense of Location for a Smart Personal Object", *Proceedings of Ubicomp 2003*, Seattle, WA, retrieved from <http://research.microsoft.com/en-us/um/people/horvitz/rightspot.htm> on Feb. 5, 2009,(2003), 1 pages.

Lamarca, Anthony et al., "Place Lab: Device Positioning Using Radio Beacons in the Wild", *In Proceedings of Pervasive 2005*, Munich, Germany, retrieved from <http://www.placelab.org/publications/pubs/pervasive-placelab-2005-final.pdf> on Feb. 5, 2009,(2005),18 pages.

Lester, et al., "Validated Caloric Expenditure Estimation using a Single Body-Worn Sensor", *Proceedings of the 11th international conference on Ubiquitous computing*, (Oct. 2009),10 pages.

Lester, et al., "A Practical Approach to Recognizing Physical Activities", *Pervasive Computing in Pervasive Computing*, vol. 3968, (2006),17 pages.

Liao, Lin et al., "Extracting Places and Activities from GPS Traces Using Hierarchical Conditional Random Fields", *The International Journal of Robotics Research*, vol. 26, No. 1, 119-134, retrieved from <http://ijr.sagepub.com/cgi/content/26/1/119> on Feb. 5, 2009,(2007), 20 pages.

Lin, Kaisen et al., "Energy-Accuracy Trade-off for Continuous Mobile Device Location", *In Proceedings of ACM Mobisys 2010*, Available at <http://research.microsoft.com/apps/pubs/default.aspx?id=120831>,(Jun. 15, 2010), pp. 1-14.

Lin, Tsung-Han et al., "Enabling Energy-Effcient and Quality Localization Services", *National Taiwan Univeristy*, retrieved from <http://nslab.ee.ntu.edu.tw/publication/conf/qols-percom06.pdf> on on Feb. 5, 2009,(2006), 4 pages.

Lu, et al., "Sound Sense; Scalable Sound Sensing for People-Centric Sensing Applications on Mobile Phones", *Proceedings of the 7th international conference on Mobile systems, applications, and services*, (Jun. 2009),14 pages.

Mohan, e al., "Nericell: Rich Monitoring of Road and Traffic Conditions using Mobile Smartphones", *Proceedings of the 6th ACM conference on Embedded network sensor systems*, (Nov. 2008),14 pages.

Oliver, et al., "Health Gear: A Real-Time Wearable System for Monitoring and Analyzing Physiological Signals", (Apr. 2006), pp. 1-4.

Paek, Jeongyeup et al., "Energy-Efficent Rate-Adaptive GPS-based Positioning for Smartphones", *In Proceedings of MobiSys 2010*, Available at <http://enl.usc.edu/papers/cache/Paek10a.pdf>,(Jun. 2010),16 pages.

Peng, Chunyi et al., "BeepBeep: A High Accuracy Acoustic Ranging System Using COTS Mobile Devices", *ACM, SenSys 2007*, Nov. 6-9, 2007, Sydney, Australia, retrieved from <http://research.microsoft.com/en-us/groups/wn/sensys106-beepbeep.pdf> on Feb. 5, 2009,(Nov. 6, 2007),14 pages.

Pering, et al., "The PSI Board: Realizing a Phone-Centric Body Sensor Network", *In 4th International Workshop on Wearable and Implantable Body Sensor Networks*, (2007), 6 pages.

Person, Jon "Writing Your Own GPS Applications: Part 2", *The Code Project*, retrieved from <http://www.codeproject.com/KB/mobile/WritingGPSApplications2.aspx> on Feb. 5, 2009,(Dec. 20, 2004),13 pages.

Riva, e al., "The Urbane! Revolution; Sensor Power to the People!", *IEEE Pervasive Computing* vol. 6, No. 2, (Apr. 2007), pp. 41-49.

Ruairi, Ronan M., et al., "An Energy-Efficient, Multi-Agent Sensor Network for Detecting Diffuse Events",*IJCAI-07*, retrieved from <http://www.aaai.org/Papers/IJCAI/2007/IJCAI07-224.pdf> on Feb. 5, 2009,(2007), pp. 1390-1395.

Schindler, Grant et al., "City-Scale Location Recognition", *IEEE Computer Society Conference on Computer Vision and Pattern Recognition (CVPR)*, retrieved from <http://www.cc.gatech.edu/~phlosoft/files/schindler07cvpr2.pdf> on Feb. 5, 2009,(2007), 7 pages.

Shin, et al., "DEAMON: Energy-effcient sensor monitoring", *6th Annual IEEE Communications Society Conference on Sensor, Mesh and Ad Hoc Communications and Networks*, (Jun. 22, 2009), 9 pages.

Smailagic, Asim et al., "Location Sensing and Privacy in a Context-Aware Computing Environment", *IEEE Wireless Communications*, retrieved from <http://diuf.unifr.ch/pai/education/2002_2003/seminar/winter/telecom/01043849.pdf> on Feb. 5, 2009,(Oct. 2002), pp. 10-17.

Sun, Guolin et al., "Signal Processing Techniques in Network-aided Positioning", *IEEE Signal Processing Magazine*, Available at <http://www.cspl.umd.edu/sig/publications/sun_survey_200507.pdf>,(Jul. 2005), pp. 12-23.

Wang, et al., "A Framework of Energy Efficient Mobile Sensing for Automatic User State Recognition", *Proceedings o the 7th international conference on Mobile systems, applications, and services*, (Jun. 2009),14 pages.

Woodman, et al., "Pedestrian Localisation for Indoor Environments", *Proceedings of the 10th international conference on Ubiquitous computing*, (Sep. 2008),10 pages.

Youssef, Moustafa et al., "The Horus WLAN Location Determination System", *Department of Computer Science, University of Maryland*, retrieved from <http://www.cs.umd.edu/~moustafa/papers/horus_usenix.pdf> on Feb. 5, 2009,(2005), 14 pages.

Yu, et al., "Personalized Awareness and Safety with Mobile Phones as Sources and Sinks", *Proceedings of Urbansense, workshop held in conjunction with SenSys*, (Nov. 4, 2008), pp. 26-30.

Zhang, Kaifu et al., "The Two Facets of the Exploration-Exploitation Dilemma", *Proceedings of the IEEE/WIC/ACM International Conference on Intelligent Agent Technology*, (IAT '06)from <http://ieeexplore.ieee.org/ielx5/4052878/4052879/04052945.pdf?tp=> on Feb. 5, 2009,(2006), 7 pages.

(56) References Cited

OTHER PUBLICATIONS

Zhuang, Zhenyun et al., "Improving Energy Effciency of Location Sensing on Smartphones", In Proceedings of MobiSys 2010, Available at <http://www.deutsche-telekom-laboratories.com/~kyuhan/papers/MobiSys10Kim.pdf>,(Jun. 2010), 15 pages.
"International Search Report", Mail Date: Apr. 24, 2013, Application No. PCT/US2012/071562, Filed date: Dec. 23, 2012, pp. 9.
"Corrected Notice of Allowance", U.S. Appl. No. 13/726,097, Aug. 21, 2014, 2 pages.
"Corrected Notice of Allowance", U.S. Appl. No. 13/726,097, Oct. 1, 2014, 2 pages.
"Final Office Action", U.S. Appl. No. 13/726,099, Aug. 29, 2014, 10 pages.
"Foreign Office Action", AU Application No. 2011312743, Aug. 15, 2014, 4 Pages.
"Non-Final Office Action", U.S. Appl. No. 13/875,139, Oct. 24, 2014, 15 Pages.
"Notice of Allowance", U.S. Appl. No. 12/897,586, Oct. 15, 2014, 13 Pages.
"CameraLock Cydia Tweak—Add a Camera Button to Your Lockscreen Without iOS 5—iPhone & iPpd Touch", Retrieved from: https://www.youtube.com/watch?v=ECGm54OB6e0, Jun. 21, 2011, 1 page.
"Final Office Action", U.S. Appl. No. 13/090,474, Nov. 25, 2014, 13 pages.
"Final Office Action", U.S. Appl. No. 13/726,027, Jan. 5, 2015, 19 pages.
"Final Office Action", U.S. Appl. No. 13/726,043, Mar. 3, 2015, 19 pages.
"Final Office Action", U.S. Appl. No. 13/726,090, Oct. 2, 2014, 30 pages.
"Foreign Notice of Allowance", AU Application No. 2011312743, Nov. 25, 2014, 2 Pages.
"Foreign Office Action", CL Application No. 201200886, Feb. 3, 2015, 6 Pages.
"Foreign Office Action", CN Application No. 201110317851.5, Nov. 14, 2014, 15 Pages.
"Foreign Office Action", EP Application No. 12859485.0, Feb. 12, 2015, 5 pages.
"Foreign Office Action", EP Application No. 12860631.6, Feb. 16, 2015, 5 pages.
"In Case of Emergency (ICE) and smart phone with lock screens", Ars Technica Open Forum—Retrieved at: http://arstechnica.com/civis/viewtopic.php?f=20&t=1140661, Mar. 29, 2011, 8 pages.
"Non-Final Office Action", U.S. Appl. No. 13/726,027, Jun. 24, 2014, 17 pages.
"Non-Final Office Action", U.S. Appl. No. 13/726,040, Jan. 28, 2015, 14 pages.
"Non-Final Office Action", U.S. Appl. No. 13/726,043, Sep. 11, 2014, 14 pages.
"Non-Final Office Action", U.S. Appl. No. 13/726,048, Dec. 9, 2014, 12 pages.
"Non-Final Office Action", U.S. Appl. No. 13/726,049, Dec. 4, 2014, 9 pages.
"Non-Final Office Action", U.S. Appl. No. 13/726,090, Jun. 24, 2014, 28 pages.
"Non-Final Office Action", U.S. Appl. No. 13/726,092, Feb. 12, 2015, 21 pages.
"Non-Final Office Action", U.S. Appl. No. 13/726,099, Jan. 7, 2015, 10 pages.
"Notice of Allowance", U.S. Appl. No. 12/897,586, Jan. 5, 2015, 7 Pages.
"Restriction Requirement", U.S. Appl. No. 13/726,048, Jun. 20, 2014, 5 pages.
"Restriction Requirement", U.S. Appl. No. 13/726,049, Jul. 1, 2014, 6 pages.
"Supplemental Notice of Allowance", U.S. Appl. No. 12/897,586, Mar. 3, 2015, 2 Pages.
"Supplementary European Search Report", EP Application No. 12859485.0, Jan. 23, 2015, 4 pages.
"Supplementary European Search Report", EP Application No. 12860631.6, Jan. 5, 2015, 3 pages.
Raja, "How to Replace and Customize Android Lock Screen [Guide]", Retrieved at: http://www.addictivetips.com/mobile/how-to-replace-and-customize-android-lock-screen-guide/, Jun. 10, 2011, 14 pages.
"Final Office Action", U.S. Appl. No. 12/897,586, May 22, 2013, 4 pages.
"Final Office Action", U.S. Appl. No. 13/726,048, Aug. 5, 2015, 13 pages.
"Final Office Action", U.S. Appl. No. 14/686,300, Jul. 29, 2015, 13 pages.
"Foreign Office Action", CL Application No. 201300886, May 13, 2015, 7 pages.
"Foreign Office Action", CN Application 201110317851.5, May 20, 2015, 8 pages.
"Foreign Office Action", EP Application No. 12859600.4, Jun. 1, 2015, 8 Pages.
"Foreign Office Action", EP Application No. 12860373.5, Jul. 7, 2015, 6 pages.
"Foreign Office Action", JP Application No. 2013-532806, Jun. 10, 2015, 11 pages.
"Non-Final Office Action", U.S. Appl. No. 12/897,586, Oct. 18, 2012, 12 pages.
"Non-Final Office Action", U.S. Appl. No. 13/726,049, Jul. 7, 2015, 14 pages.
"Non-Final Office Action", U.S. Appl. No. 13/726,090, Jun. 23, 2015, 31 pages.
"Non-Final Office Action", U.S. Appl. No. 14/495,418, Jul. 2, 2015, 18 pages.
"Non-Final Office Action", U.S. Appl. No. 14/686,300, Jun. 8, 2015, 11 pages.
"Supplementary European Search Report", EP Application No. 12860373.5, Jun. 25, 2015, 3 pages.
"Extended European Search Report", EP Application No. 12859600.4, May 13, 2015, 7 pages.
"Final Office Action", U.S. Appl. No. 13/726,099, May 8, 2015, 11 pages.
"Foreign Office Action", CL Application No. 201300886, Feb. 2, 2015, 7 pages.
"Foreign Office Action", EP Application 12859972.7, May 26, 2015, 4 pages.
"Mobile Phone Match-Up", Retrieved at: <http://www.microsoft.com/windowsmobile/enus/meet/version-compare.mspx>, Jul. 27, 2010, 4 pages.
"Non-Final Office Action", U.S. Appl. No. 13/090,474, Apr. 8, 2015, 11 pages.
"Notice of Allowance", U.S. Appl. No. 13/875,139, Mar. 5, 2015, 7 pages.
"Setting up and Using Smart Unlock on the Samsung Jet", Retrieved at: <http://www.knowyourmobile.com/samsung/samsungjet/samsungjetuserguides/317988/setting_up_and_using_smart_unlock_on_the_samsung_jet.html>, Jun. 20, 2010, 2 pages.
"Supplementary European Search Report", EP Application No. 12859972.7, Apr. 30, 2015, 3 pages.
"T-Mobile G1 Google Android Phone—Gesture Unlocking", Retrieved at: <http://www.gadgetuniversegift.com/?p=2121>, Jun. 20, 2010, 2 pages.
"T-Mobile G1 User Manual", pp. 102-103, May 27, 2009, 5 pages.
Bhandari,"Full Touchscreen Samsung Star (S5233), Star 3G (S5603) and Beat DJ Launched in India", Retrieved at: http://www.tecfre.com/full-touchscreen-samsung-star-s5233-star-3g-s5603-and-beat-dj-launched-in-india/, May 11, 2009, 12 pages.
Chen,"Here's the Google Phone Apple Wants You to Have", Retrieved at: http://www.wired.com/2010/03/apple-htc-google/, Mar. 5, 2010, 9 pages.
Ciprian,"Manage User Accounts", Retrieved at: http://www.vista4beginners.com/Manage-User-Accounts, May 8, 2007, 13 pages.

\* cited by examiner

MOBILE DEVICE CHILD SHARE

RELATED APPLICATIONS

This application claims priority under 35 U.S.C. Section 119(e) to U.S. Provisional Application Ser. No. 61/695,294 filed Aug. 30, 2012 entitled "Mobile Device Kid Space", the disclosure of which is incorporated by reference herein in its entirety.

BACKGROUND

Many types of devices, such as mobile phones, tablet devices, and other computing, communication, and entertainment devices increasingly offer more functions, applications, and features which are beneficial to a user, and can enhance one's personal time as well as work and social activities. For example, not only can a mobile phone be used for text, email, and voice communications, but may also be used for entertainment, such as to listen to music, surf the Internet, watch video content, gaming, and for photo and video imaging. Similarly, a portable tablet device may be utilized for email, browser, navigation, and other computing applications, as well as for the various entertainment and photo features. In addition to the many computing, communication, and entertainment applications that are available to a user of a mobile phone or tablet device, a seemingly unlimited number of third-party applications and features are also available for download to a device.

Parents of younger children that do not yet have their own mobile phones often find that a child wants to "play" with their phone to play games, take pictures, listen to music, and other activities. Typically, a parent may pass his or her phone to a young child in the back seat of the car while driving to keep the child entertained. The parent may not know then what features and applications the child access on the device, such as a Web browser or unintentionally accessing an email application, or which device settings may have been changed, such as audio settings, alarm settings, calendar notices, and the like.

SUMMARY

This Summary introduces features and simplified concepts of mobile device child share, which is further described below in the Detailed Description and/or shown in the Figures. This Summary should not be considered to describe essential features of the claimed subject matter, nor used to determine or limit the scope of the claimed subject matter.

Mobile device child share is described. In embodiments, a mobile device can display a default device lock screen on an integrated display device, and receive an input effective to transition from the default device lock screen to display a child lock screen without receiving a PIN code entered on the default device lock screen. The mobile device can receive a second input effective to transition from the child lock screen to display a child space, such as a child start screen. The mobile device implements a device share service that activates a child share mode of the mobile device, and restricts functionality of device applications and access to device content based on designated restriction limits.

In embodiments, the child share mode may be activated based on a child share profile that includes device application functionality restriction settings and device content access restriction settings. The device share service is implemented to allow restricted device application functionality in the child space and allow restricted device content access in the child space during the child share mode. The device share service can also deactivate the child share mode responsive to an input to the mobile device and activate a user mode of the mobile device. The device share service can then restore device settings previously designated in the user mode that changed during the child share mode, such as to restore audio settings of the mobile device to volume levels that were designated prior to activation of the child share mode.

BRIEF DESCRIPTION OF THE DRAWINGS

Embodiments of mobile device child share are described with reference to the following Figures. The same numbers may be used throughout to reference like features and components that are shown in the Figures.

DETAILED DESCRIPTION

Embodiments of mobile device child share are described and provide a device share service that can be implemented as a client device service or application, such as in a mobile phone, portable tablet device, or other type of computing and/or communication device. Mobile device child share enables implementation of a "Kid's Corner" (also referred to as a kid space or child zone) for parental control of any applications, data, functions, and features of a mobile device so that a parent can allow a child to play with the device without having access to the restricted applications, data, functions, and features. Kid's Corner is a child share space that provides a custom destination on a mobile phone just for a child, and where the child goes to "play" on the device.

In a child share space, child access is restricted to only the applications, games, music, videos, movies and other content that a parent chooses. All of the settings and content outside of the Kid's Corner is protected and purchases can be blocked while in the Kid's Corner. The blocked and/or restricted applications and features of a mobile device may include the ability to make a phone call, send a text or access email, and access the Internet, such as to post to social networks or to search the Internet. When the parent retrieves his or her mobile device from a child, the parent can simply press the device power button, or provide another input to another designated selectable control, to deactivate the child share mode and reinitiate the default lock screen on the device, from which the parent user can then access the mobile device with a lock-screen password.

While features and concepts of mobile device child share can be implemented in any number of different devices, systems, environments, and/or configurations, embodiments of mobile device child share are described in the context of the following example devices, systems, and methods.

Figure 1:
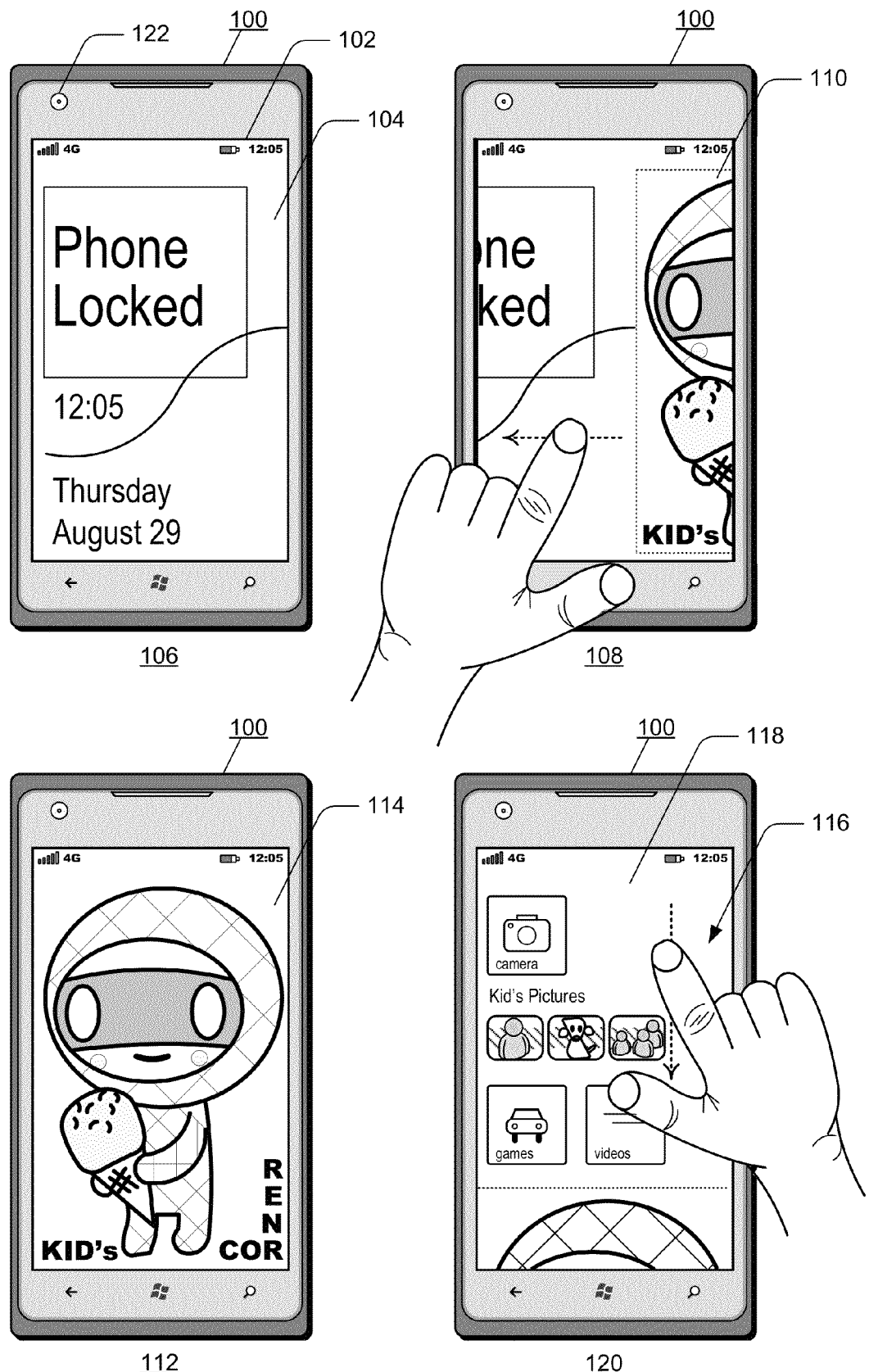
FIG. 1 illustrates an example of mobile device child share.

FIG. 1 illustrates an example of graphical user interfaces of a mobile device child share and related methods. An example mobile device 100 may be any one or combination of a mobile phone, tablet device, computing device, communication, entertainment, gaming, navigation, and/or other type of portable electronic device. A child space (also referred to as a "Kid's Corner") can be implemented to permit a parent control of a child's access to content, as well as access to any applications, functions, and features of the mobile device 100 so that a parent can allow a child to play with the device without having access to the restricted applications, functions, features, and content. The Kid's Corner can be implemented from a separate start screen environment where a child (also referred herein to as a kid) can access allowed games, music, videos, applications, communication functions, as well as any other functions and features of a mobile device that have not been restricted by a parent, or alternatively, have been allowed by the parent.

The example mobile device 100 includes an integrated display device 102 on which user interfaces can be displayed, such as a default device lock screen 104 that indicates the device is locked at 106. For example, a user of the mobile device may be a parent of children, and the parent may set-up the device to lock when not in use so that the kids do not inadvertently access applications, such as email and text, and/or have access to the Internet via a browser application.

The parent user of the mobile device 100 can allow a child to play with the phone, and hand the phone over without having to unlock the device from the default device lock screen 104, e.g. in some examples without having to provide a personal identity number (PIN) or other authentication credential. As shown in the example 108, a child that has the phone can swipe the default device lock screen with a gesture input (e.g., a horizontal swipe gesture) to access a child lock screen 110, which is illustrated at 112 as the "Kid's Corner" welcome screen 114. From the Kid's Corner welcome screen 114 (e.g., a child lock screen), the child can then swipe the screen with another gesture input (e.g., a vertical swipe gesture), such as in a different direction 116, to access a child space 118, as shown in the example 120.

In implementations, the inputs used to make these transitions may be any type of user and/or gesture or keystroke input in any direction on the integrated display device 102 of the mobile device. Alternatively or in addition, any type of device, button, and/or gesture inputs may be utilized effective to transition from the default device lock screen 104 to the child lock screen 110, and subsequently to the child space 118. In an implementation, the display may pause when transitioned from the default device lock screen to the child lock screen, and then automatically transition to the child space without further input. Alternatively, a transition from the default device lock screen to the child space may be accomplished by omitting the child lock screen altogether.

From the child space 118, the child can access the kid's camera (e.g., allowed camera functionality of an integrated digital camera 122) and the pictures taken by a child in Kid's Corner, which may be maintained in a designated local picture space on the device rather than being uploaded to cloud-based storage. The child can also access allowed games, music, images, videos, applications, communication functions, as well as any other functions and features of the mobile device 100 that have not been restricted by the parent (or alternatively, have been proactively allowed). A parent may also pin photos in the child space that the child cannot delete. The description, layout, orientation, features, and organization of the text, images, photos, graphics, links, data, information, and presentation features shown with reference to the example child share user interfaces (e.g., the Kid's Corner screen 114 and the child space 118), as well as with reference to any other user interfaces described herein and/or shown in the figures, are merely examples that may be altered in any aspect for various embodiments and/or implementations of mobile device child share.

Figure 2:
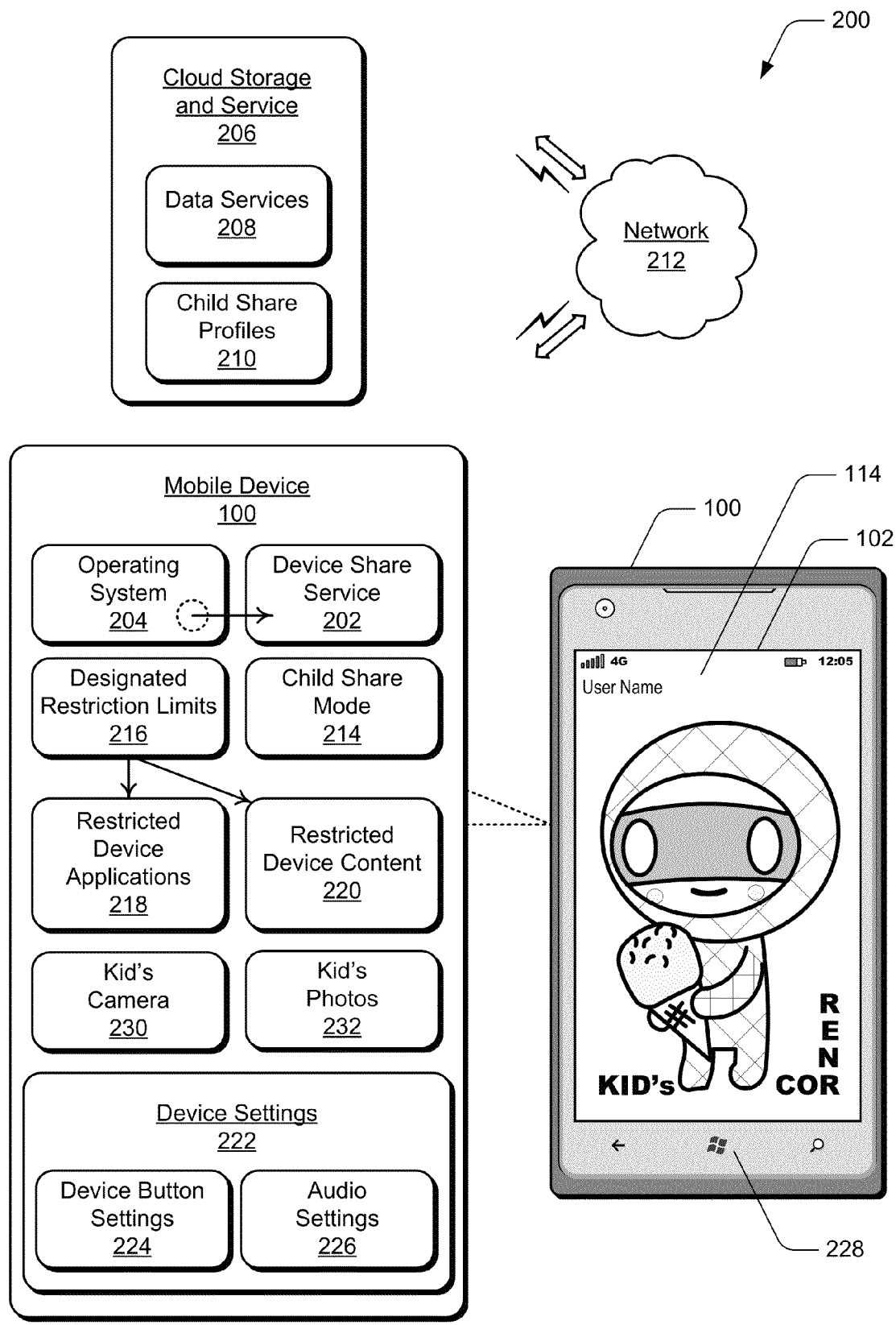
FIG. 2 illustrates an example system in which embodiments of mobile device child share can be implemented.

FIG. 2 illustrates an example system 200 in which embodiments of mobile device child share can be implemented. The example system includes the mobile device 100 as described with reference to FIG. 1, with the integrated display device 102 on which a user interface can be displayed, such as the Kid's Corner screen 114 and the child space 118. Additionally, the mobile device can be implemented with various components, such as a processor and/or memory system, as well as any number and combination of differing components as further described with reference to the example device shown in FIG. 14 to implement embodiments of mobile device child share.

The mobile device 100 includes a device share service 202 that can be implemented as a software application (e.g., executable instructions) stored on computer-readable storage media, such as any suitable memory device or electronic data storage. Additionally, the device share service 202 can be executed with a processing system at the mobile device to implement embodiments of mobile device child share as described herein. The device share service 202 may be implemented as an independent device application that is executable on the device to interface with the many applications, features, and functions of the device. The device share service 202 may also be integrated with an operating system 204 of the mobile device. The operating system can also include a hub operating system service that is implemented to integrate cloud-based services and local device applications (e.g., the device share service 202) with the operating system.

The example system 200 also includes a cloud storage and service 206 that can include any type of cloud-based (e.g., network-based) data services 208 used to store or maintain child share profiles 210, which include device application functionality restriction settings and device content access restriction settings the child space 118. When established, a child share profile is generally an account within a user account of the (adult) user owner of the device. The child share profile can be established to share device applications and device content associated with the user account of the user owner of the device with a child. There may be multiple child share profiles 210 for a single device, each of which includes different settings for multiple different kids, and each kid having a different child share profile.

The child space may include multiple implementations of Kid's Corners, and optionally, the multiple child share profiles each correspond to a different implementation of a Kid's Corner in the child space on the device. Additionally, the child share profiles can be pushed or pulled from the mobile device 100 to the cloud storage and service 206 where the child share profiles are maintained. The child share profiles can then be used with other devices, such as to synchronize between two devices of an adult user owner (e.g., a mobile phone and a tablet device), or between two different parents' devices (e.g., a mother's mobile phone and a father's tablet device) so that a child has continuity of user experience when using either of the two different devices.

Any of the devices and services (e.g., implemented as server devices) described herein can communicate via a network 212, which can be implemented to include a wired and/or a wireless network. The network can also be implemented using any type of network topology and/or communication protocol, and can be represented or otherwise implemented as a combination of two or more networks, to include IP-based networks and/or the Internet. The network may also include mobile operator networks that are managed by a mobile network operator and/or other network operators, such as a communication service provider, mobile phone provider, and/or Internet service provider. Alternatively or in addition, peer-to-peer communication techniques may be utilized.

The device share service 202 is implemented to manage a child share mode 214 that includes designated restriction limits 216, such as parental control settings to limit and/or restrict device applications (e.g., restricted device applications 218), as well as limit and/or restrict access to device content (e.g., restricted device content 220). A user owner of the mobile device 100, typically a parent of a child, can choose the device applications and features, and/or device content, that can be accessed by a child or guest in the child space while the child share mode is activated. Further, a device application may be allowed a restricted level of functionality while running in the child space, yet generally cannot access restricted device content, such as contacts, email, and calendar databases, as well as limited access to the device file system. A set of content databases, device file system, Internet access, Application Programming Interfaces (APIs), and other allowed device content and features can be protected from device application access when a restricted execution mode is activated on the device. For example, a device application that can access the Internet, email, contacts, etc. may be automatically restricted when the parent allows a child to access the device application in the child space. The restricted execution mode limits navigation to a subset of application tasks (for example access to only kids games, but no access to email applications) or limits the experience of the applications themselves. For example, a digital camera application can allow a user to take and view new photos, but previous photos will be restricted from viewing.

The user interface start screen of the child space 118 is customizable for or by the child and/or by the user owner of the device. For example, a parent can add applications, such as for games and music, to the child space so that the applications are recognized and can be launched in the child space. However applications that are not recognized in the child space cannot be launched in the child space. For example, if a game application that is pinned to the child space attempts to launch a browser application, the device share service 202 will check if the browser application is pinned and recognized in the child space. If the application is not, then the device share service will fail to launch the application, or if the application is recognized, then the application can be launched in the child space.

As described with reference to FIG. 1, an input can be received, such as a gesture input or selectable control input, and the device share service 202 initiates a transition from displaying the default device lock screen 104 to display the child lock screen 110, typically without receiving a PIN code entered on the device lock screen. A second input can then be received, such as another gesture input, to transition from displaying the child lock screen 110 to display the child space 118, and the device share service 202 activates the child share mode 214. In implementations, the child share mode may be activated based on a child share profile 210 that includes device application functionality restriction settings and device content access restriction settings.

The device share service 202 is also implemented to manage device settings to 222 of the mobile device 100 when the child share mode 214 is activated. The device settings can include device button settings 224 and audio settings 226, as well as any other type of configuration and settings of the mobile device. For example, the device share service 202 can deactivate a capacitive device button 228 in the child share mode 214 so as to avoid a child inadvertently initiating a different device mode or starting a device application. During activation of the child share mode, button and/or user input actuations can be selectively turned-off or changed, so that a child can not adjust the volume (e.g., a hardware button) or change software controls. This can also makes it easier for a child to use the device when the child share mode 214 is activated on the device.

Setup and activation of mobile device child share on the mobile device 100 can include locking and/or disabling the hardware controls via software as a broad "restriction" feature of mobile device child share. A hardware lock feature provides that a user owner of the mobile device 100 can press a combination of hardware buttons to place the device in a state where the capacitive device buttons (e.g., capacitive button 228) on the front of the device are disabled. Subsequently pressing the same combination of hardware buttons (or a different pre-determined combination) re-enables the device buttons. Alternatively or in addition, the user owner can place the mobile device in a state where the capacitive device buttons on the front of the device are disabled by tapping on a software button that is on the screen, and pressing the software button again re-enables the device hardware buttons.

The device share service 202 is also implemented to allow a child access to a kid's camera 230 (e.g., a camera application and allowed camera functionality of the device camera), which allows the child to take photos 232 with the digital camera 122 of the mobile device while the child share mode 214 is activated. However, the device share service 202 restricts uploading the digital photos to the cloud storage and service 206 while the child share mode is activated, and the kid's photos 232 may be stored in a designated photo space on the mobile device. The kid's photos 232 can be saved as just the photos taken by the child when using the mobile device in the child share mode. Further, the child may be restricted from viewing or accessing the photos of the user owner of the device.

The device share service 202 at the mobile device 100 can also be implemented to restrict incoming or outgoing phone calls while the child share mode 214 is activated, such as by disallowing them altogether (with the possible exception of placing an emergency call) or by requiring a PIN to answer an incoming phone call or place an outgoing call. Alternatively or in addition, the device share service at the mobile device may allow the ring tone indicating an incoming phone call to play audibly at a preset (e.g., high) volume over an integrated speaker of the mobile device, even though a headset is connected to a headset port of the mobile device or the general volume is switched-off or is set at a low level while the child share mode is activated. This can help to avert common frustrations of parents who share their phone using existing systems. For example, in some existing systems, a child may use headphones or turn the sound down on his parent's device, and his parent misses a phone call when she gets the phone back if she forgets to remove the headphones for the device or turn the volume back up.

In such existing systems, the parent may also miss a phone call while the child is using the device. For example, a phone call may just ring through to the child, who may not tell the parent of the existence of the incoming call. With the systems described herein, even if the device is being used by a child with headphones or the child has reduced the volume of an integrated speaker, an incoming phone call will ring audibly through the integrated speakers at a parent-set volume, and not at the volume that may have been set by a child when using the device in the child space. Similar volume adjustments may be made by a device share service to provide an audible or other indicator of other notifications to a parent when the child share mode is activated, such as notifications of new text messages, calendar reminders, or new email notifications.

The setup and activation of mobile device child share on the mobile device 100 includes the audio settings 226 to control the sounds that matter to the user owner, and the child controls the sounds that matter to him or her in the child space. For example, a volume rocker key or similar volume control can be restricted to only affect the volume of media content playback, such as music, videos, and games. The volume rocker or similar volume controls may be restricted from affecting other system sounds (e.g., incoming call ring volume, or other notification sound volumes) in the child space, and these system sounds may instead be played back at the volume the user owner has set and may be played through the device integrated speaker even if headphones are connected to the device. The user owner can also setup the device share service 202 to manage notifications, such as toasts, reminders, alarms, and the like so that they do not show up in the child space while the child share mode 214 is activated. The reminders and notifications can be queued on the lock screen, such as if the screen were in an off mode.

The device share service 202 at the mobile device 100 is implemented to receive a predefined input to the mobile device 100, such as a user input to the device power button, and the device share service 202 can then deactivate the child share mode 214. The device share service 202 can then reinitiate the display of the default device lock screen 104 on the integrated display device 102 of the mobile device as an indication that the normal user mode has been restored. The device share service 202 is also implemented to restore the audio settings 226 of the mobile device to volume levels that were designated prior to activation of the child share mode 214.

Example methods 300, 400, and 500 are described with reference to respective FIGS. 3-5 in accordance with one or more embodiments of mobile device child share. Generally, any of the services, components, modules, methods, and operations described herein can be implemented using software, firmware, hardware (e.g., fixed logic circuitry), manual processing, or any combination thereof. Example methods may be described in the general context of executable instructions stored on computer-readable storage media that is local and/or remote to a computer processing system, and implementations can include software applications, programs, functions, and the like.

Figure 3:
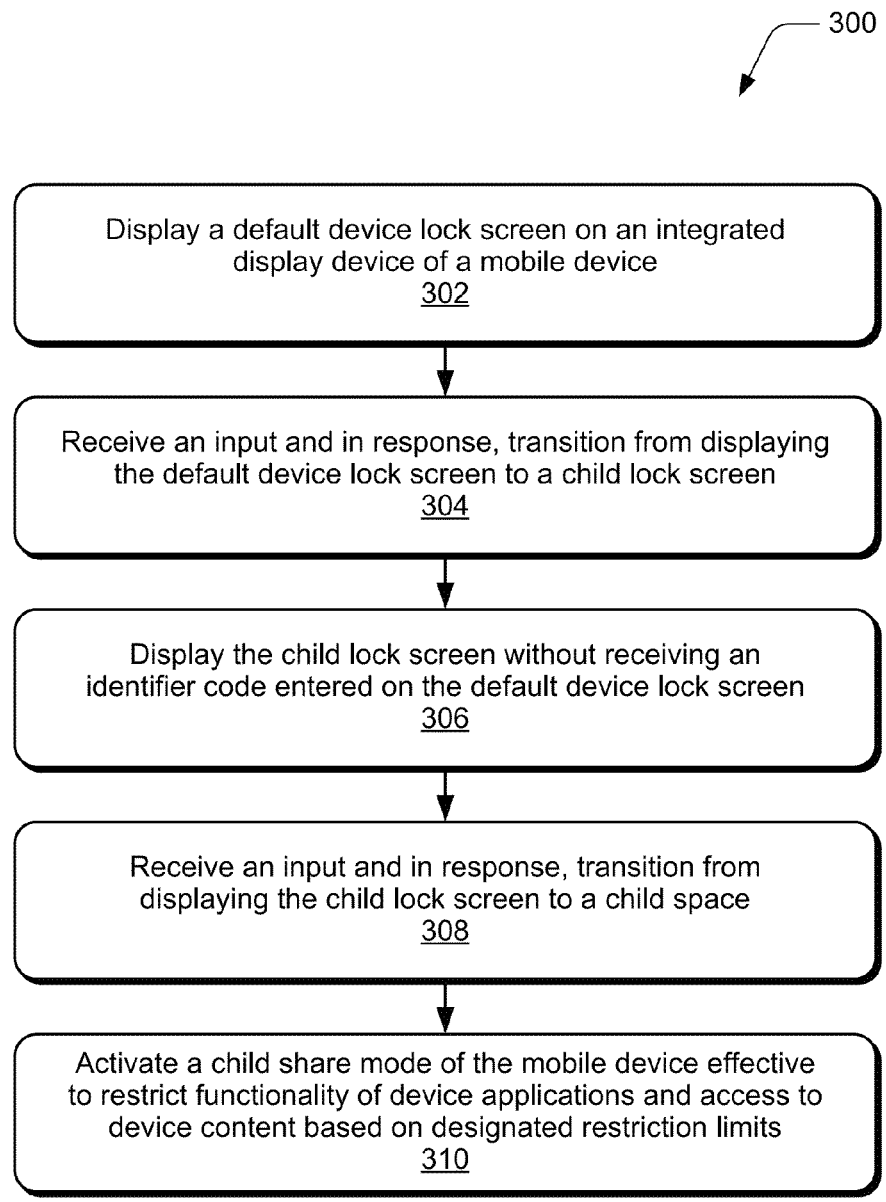
FIG. 3 illustrates example method(s) of mobile device child share in accordance with one or more embodiments.

FIG. 3 illustrates example method(s) 300 of mobile device child share. The order in which the method is described is not intended to be construed as a limitation, and any number or combination of the method operations can be combined in any order to implement a method, or an alternate method.

At 302, a default device lock screen is displayed on an integrated display device of a mobile device. For example, the mobile device 100 (FIG. 1) displays a default device lock screen 104 on the integrated display device 102 of the mobile device. At 304, an input is received and in response, the display transitions from displaying the default device lock screen to a child lock screen. For example, an input system of the mobile device 100 receives an input, such as a gesture input or selectable control input, and the input is effective to transition from displaying the default device lock screen 104 to display the child lock screen 110.

At 306, the child lock screen is displayed without receiving a PIN code or other identifier entered on the default device lock screen. For example, the mobile device 100 displays the default device lock screen (at 302) and transitions to display the child lock screen 110 on the integrated display device 102 of the mobile device. The device share service 202 at the mobile device 100 is implemented to initiate the transition from displaying the default device lock screen to the child lock screen without receiving a PIN code entered on the default device lock screen. At 308, an input is received and in response, the display transitions from displaying the child lock screen to a child space, such as a child start screen. For example, an input system of the mobile device 100 receives an input, such as a gesture or selectable control input, and the input is effective to transition from displaying the child lock screen 110 to display a child space 118. Again, this transition may be made without requiring the receipt of a PIN code or other identifier.

At 310, a child share mode of the mobile device is activated that restricts the functionality of device applications and/or access to device content based on designated restriction limits. For example, the device share service 202 at the mobile device 100 activates the child share mode 214, and restricts functionality of the restricted device applications 281 and restricts access to the restricted device content 220 based on the designated restriction limits 216. The child share mode may be activated based on a child share profile 210 that includes device application functionality restriction settings and device content access restriction settings. The aspects and features described herein for restricted execution modes (e.g., FIGS. 9-13) may be utilized to support and implement the child share mode as a restricted execution mode that is associated with a child shared space of the device to restrict the functionality of the restricted device applications 281 and restrict access to the restricted device content 220.

Examples of restricting the functionality of a device application may include not permitting the device application to be launched altogether or limiting the device application to calling only a restricted subset of API calls that is narrower than the normal set of API calls available to the application when the mobile device is running in normal user mode. Restricting access to device content also may include disallowing certain API calls that provide access to particular sets of data or content. In many examples, restricting functionality or access does not include analyzing or changing Access Control Lists (ACLs), Access Control Entries (ACEs), or similar file-system access control metadata maintained by a file system.

Figure 4:
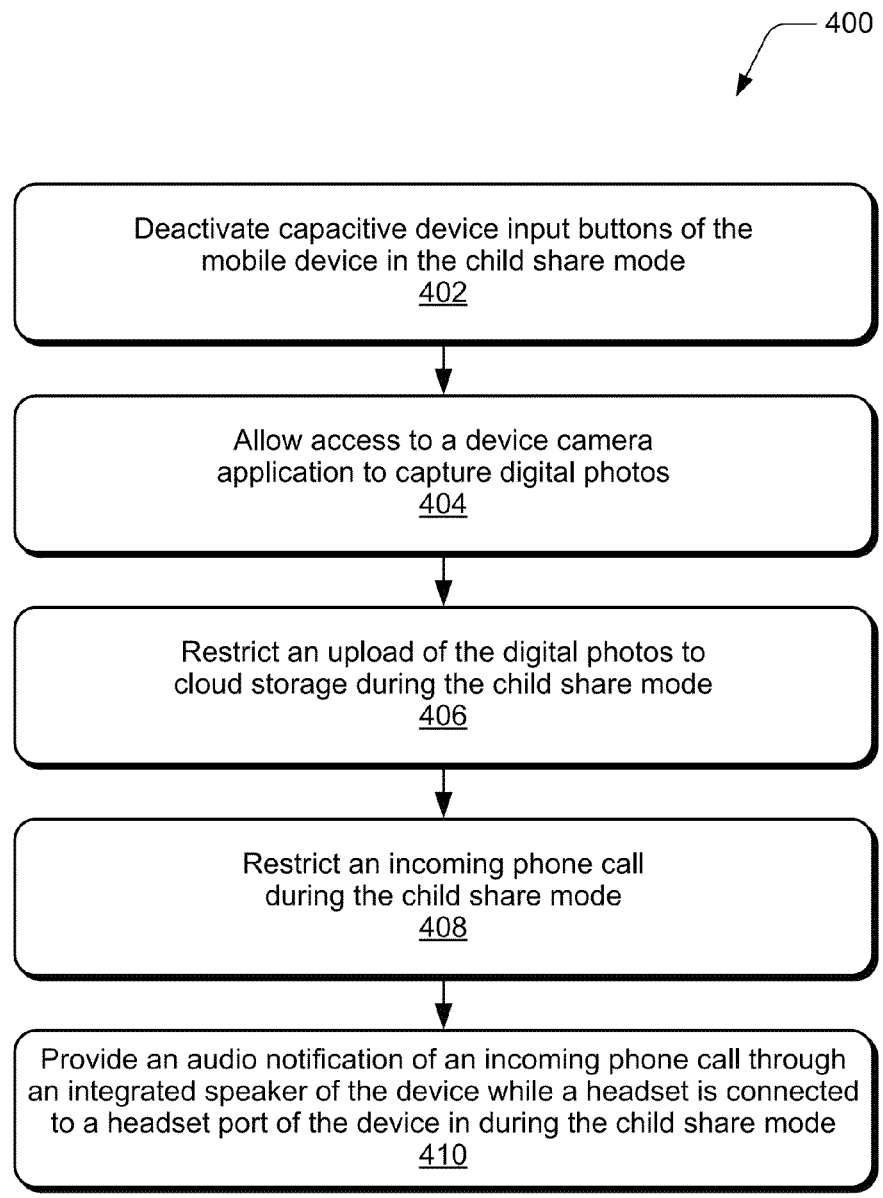
FIG. 4 illustrates example method(s) of mobile device child share in accordance with one or more embodiments.

FIG. 4 illustrates example method(s) 400 of mobile device child share. The order in which the method is described is not intended to be construed as a limitation, and any number or combination of the method operations can be combined in any order to implement a method, or an alternate method.

At 402, capacitive device input buttons of the mobile device are deactivated in the child share mode. For example, the device share service 202 (FIG. 2) at the mobile device 100 deactivates the capacitive device button 228 in the child share mode 214 so as to avoid a child inadvertently initiating a different device mode or starting a device application.

At 404, access to a device camera application is allowed to capture digital photos and, at 406, an upload of the digital photos to cloud storage is restricted during the child share mode. For example, the device share service 202 at the mobile device 100 allows access to the kid's camera 230 (e.g., a device camera application), which allows the child to take photos 232 with the digital camera 122 of the mobile device while the child share mode 214 is activated. However, the device share service restricts uploading the digital photos to the cloud storage and service 206 while the child share mode is activated.

At 408, an incoming phone call is restricted during the child share mode and alternatively or in addition, at 410, an audible notification sound for incoming phone call is provided through an integrated speaker of the mobile device while a headset is connected to a headset port of the mobile device during the child share mode. For example, the device share service 202 at the mobile device 100 restricts the acceptance of incoming phone calls while the child share mode 214 is activated, such as by requiring a PIN to initiate an incoming call or by automatically declining any incoming calls. Alternatively or in addition, the device share service 202 allows the audible notification sound for an incoming phone call to be provided through an integrated speaker of the mobile device while a headset is connected to a headset port of the mobile device while the child share mode is activated. The operations of 408 and 408 may also be preformed to restrict or provide audible notifications for other types of incoming communications, such as incoming text messages, emails, and calendar alerts.

Figure 5:
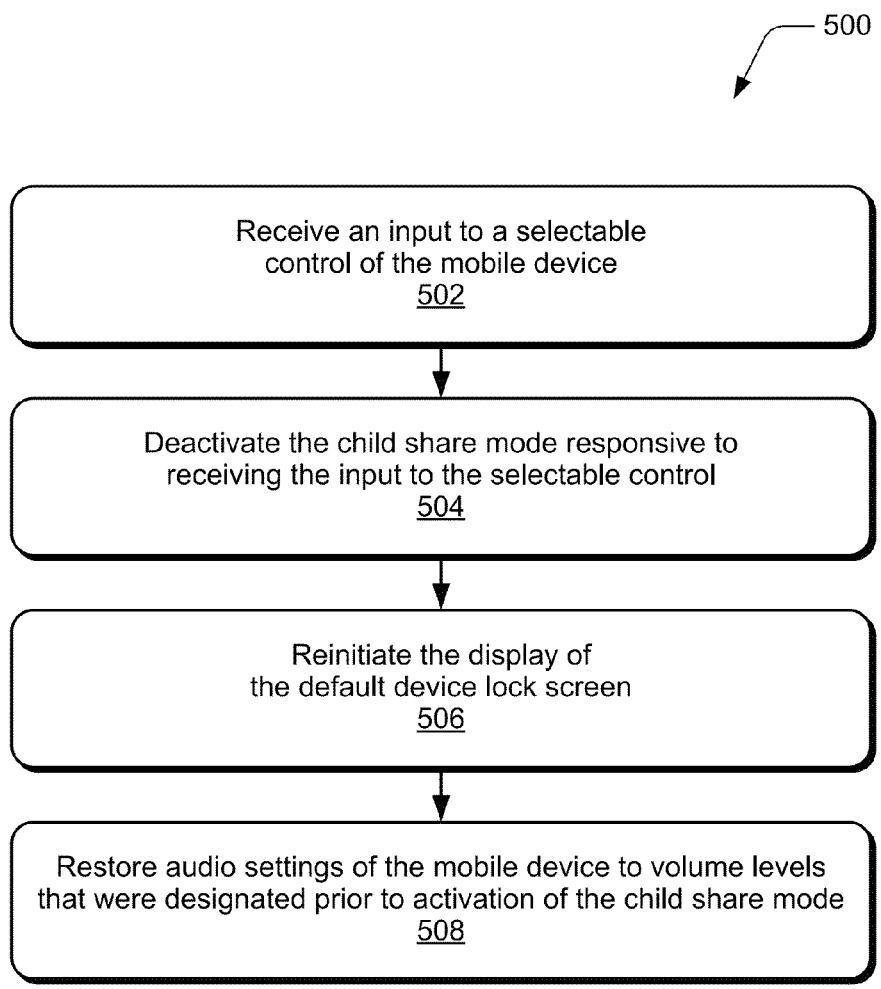
FIG. 5 illustrates example method(s) of mobile device child share in accordance with one or more embodiments.

FIG. 5 illustrates example method(s) 500 of mobile device child share. The order in which the method is described is not intended to be construed as a limitation, and any number or combination of the method operations can be combined in any order to implement a method, or an alternate method.

At 502, an input is received to a selectable control of the mobile device and, at 504, the child share mode is deactivated responsive to receiving the input to the selectable control. For example, an input to the mobile device 100 is received, such as a user input of the device power button, and the device share service 202 deactivates the child share mode 214 responsive to receiving the input to the selectable control.

At 506, the display of the default device lock screen is reinitiated. For example, the device share service 202 at the mobile device 100 reinitiates the display of the default device lock screen 104 on the integrated display device 102 of the mobile device (at 302 in FIG. 3). At 508, audio settings of the mobile device are restored to volume levels that were designated prior to activation of the child share mode. For example, the device share service 202 at the mobile device 100 restores the audio settings 226 of the mobile device to volume levels that were designated prior to activation of the child share mode 214.

Figure 6:
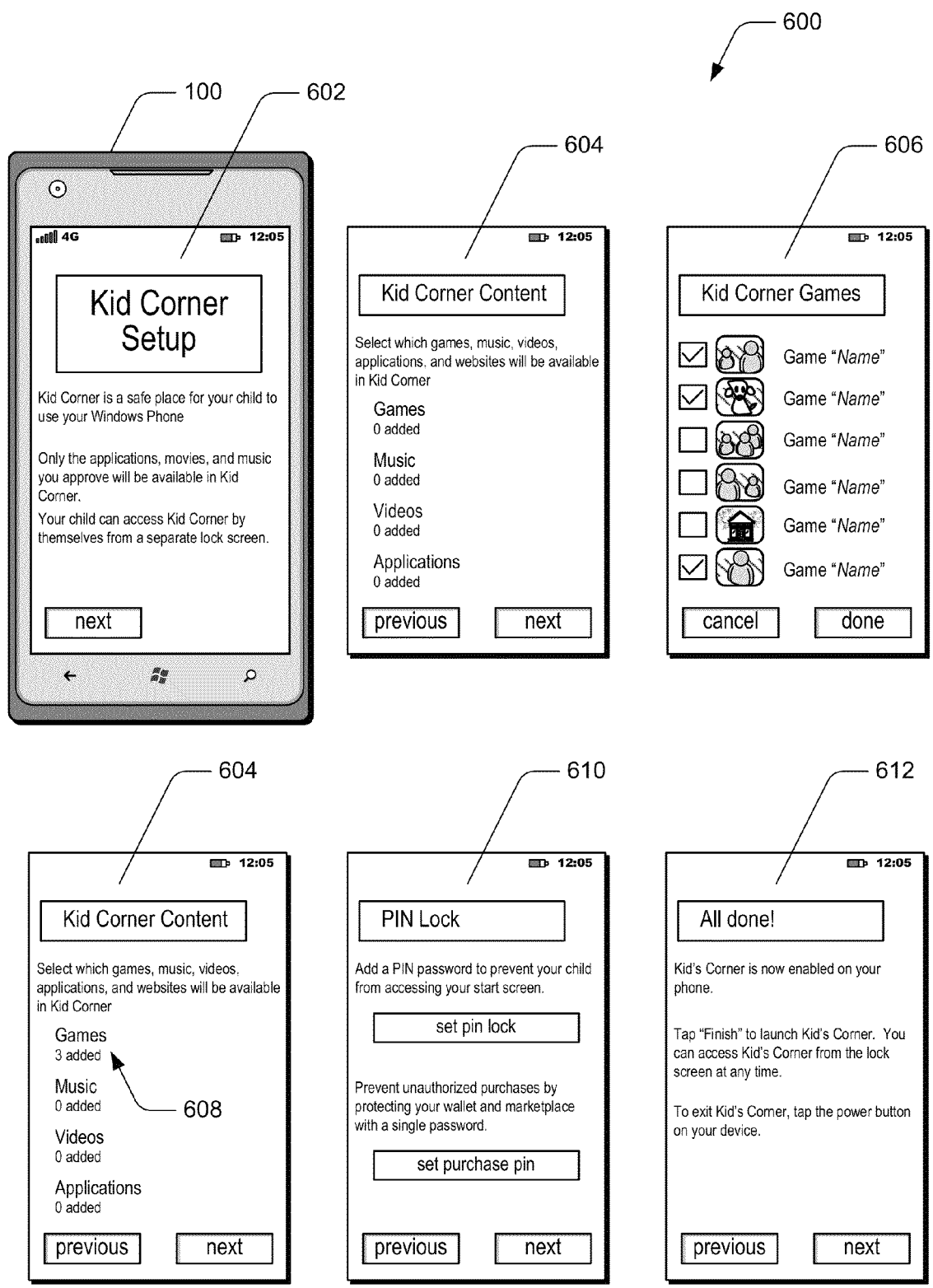
FIG. 6 illustrates setup and activation of mobile device child share on a mobile device.

FIG. 6 illustrates an example 600 of setup and activation of mobile device child share on a mobile device 100. For example, a user of the mobile device can begin setup of a child share space (e.g., "Kid's Corner") from a setup user interface 602. At a content user interface 604, the user can select which games, music, videos, applications, and websites will be available in the child share space. For example, the user can select to add games to the child share space from the content user interface 604, and then select particular games from a games user interface 606. When finished with the game selections, the content user interface 604 indicates at 608 that three games have been added to the child share space. On a PIN lock user interface 610, the user can optionally set a PIN lock to restrict start screen access and/or optionally set a purchase PIN lock to prevent unauthorized purchases when child share mode is activated on the mobile device.

Figure 7:
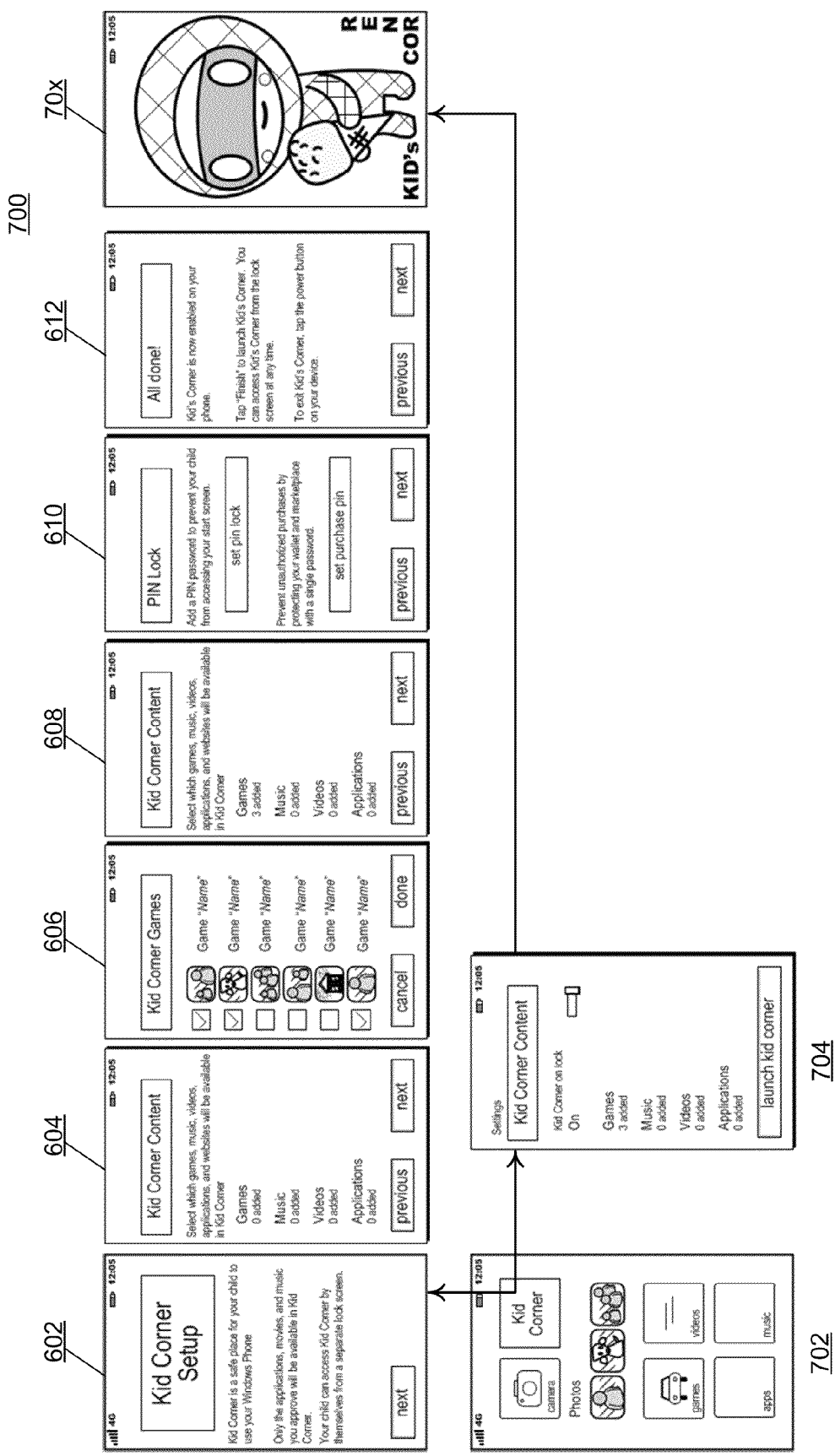
FIG. 7 illustrates mobile device child share setup and activation on a mobile device.

FIG. 7 illustrates an example 700 of mobile device child share setup and activation on a mobile device 100. For example, from a start screen 702 displayed on the mobile device, the user can select (e.g., tap input) the "kid's corner" tile. If the child share space (e.g., "Kid's Corner") is already set up on the device, as described with reference to FIG. 6, then a setting user interface 704 is displayed, from which the user can turn the child share space on or off, and launch the child share space. If the child share space is not setup on the device, then the user can setup and activate the child share space as described with reference to FIG. 6.

Figure 8:
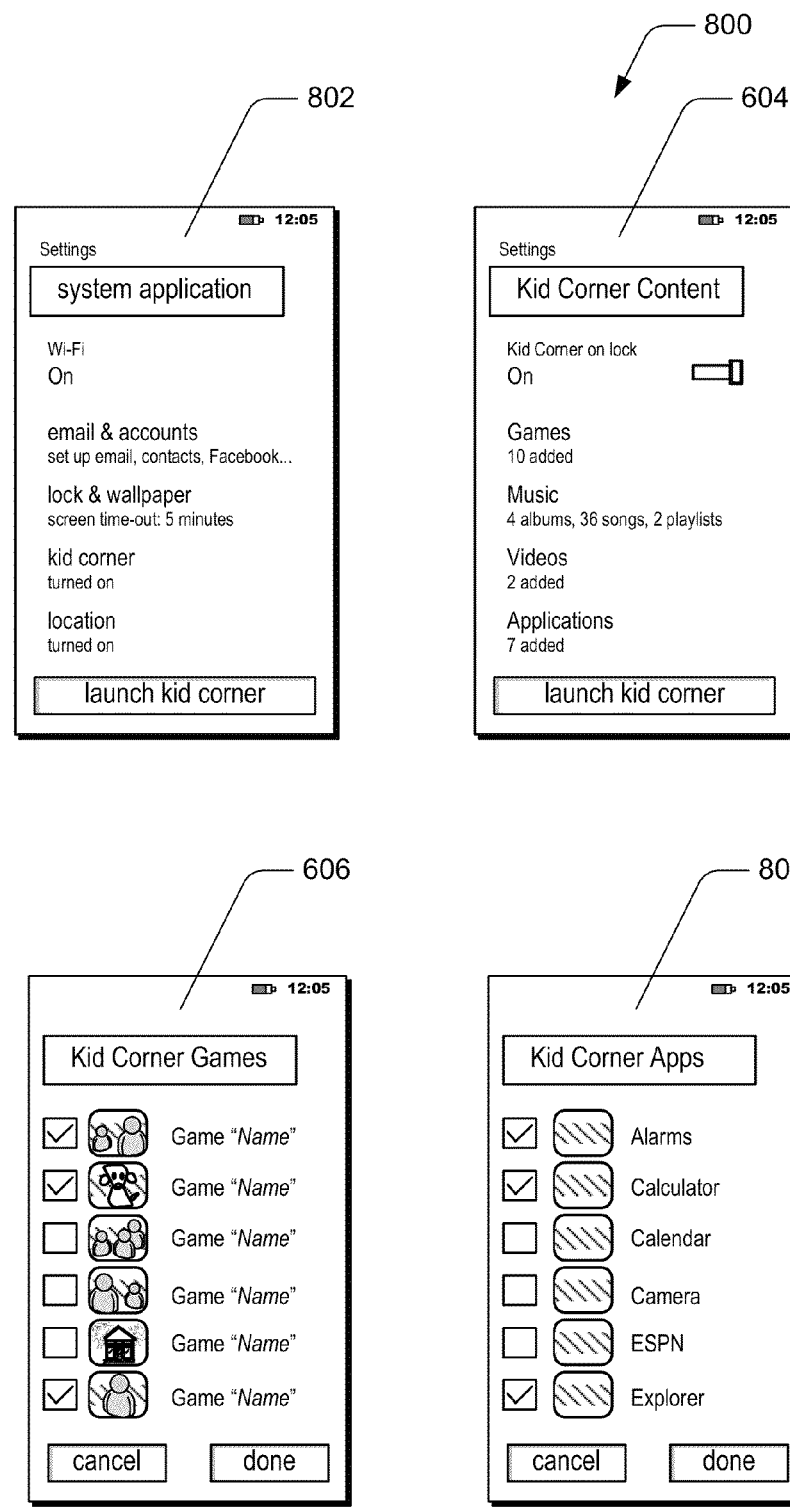
FIG. 8 illustrates managing content in embodiments of mobile device child share.

FIG. 8 further illustrates an example 800 of managing content in embodiments of mobile device child share. For example, from a system application user interface 802, the user can access the content user interface 604 (described with reference to FIG. 6), the games user interface 606, and/or an applications user interface 804 from which the user can select device applications to add to the child share space. The games and applications that are selectable from the games and applications user interfaces may also be purchased and downloaded games or applications, and/or may be games and applications that are designed specifically for use in the child share space on the mobile device. For example, an gaming application that has a teen rating may also be designed more child-appropriate for use in the child share space. In embodiments, restricted execution modes may be utilized to support and implement the child share space of a device for facilitating sharing the games, applications, and other content added to the child share space with a child. In a child share space, child access is restricted with a restricted execution mode to only the applications, games, music, videos, movies and other content that a parent chooses. All of the settings and content outside of the Kid's Corner is protected and purchases can be blocked while in the Kid's Corner.

Figure 9:
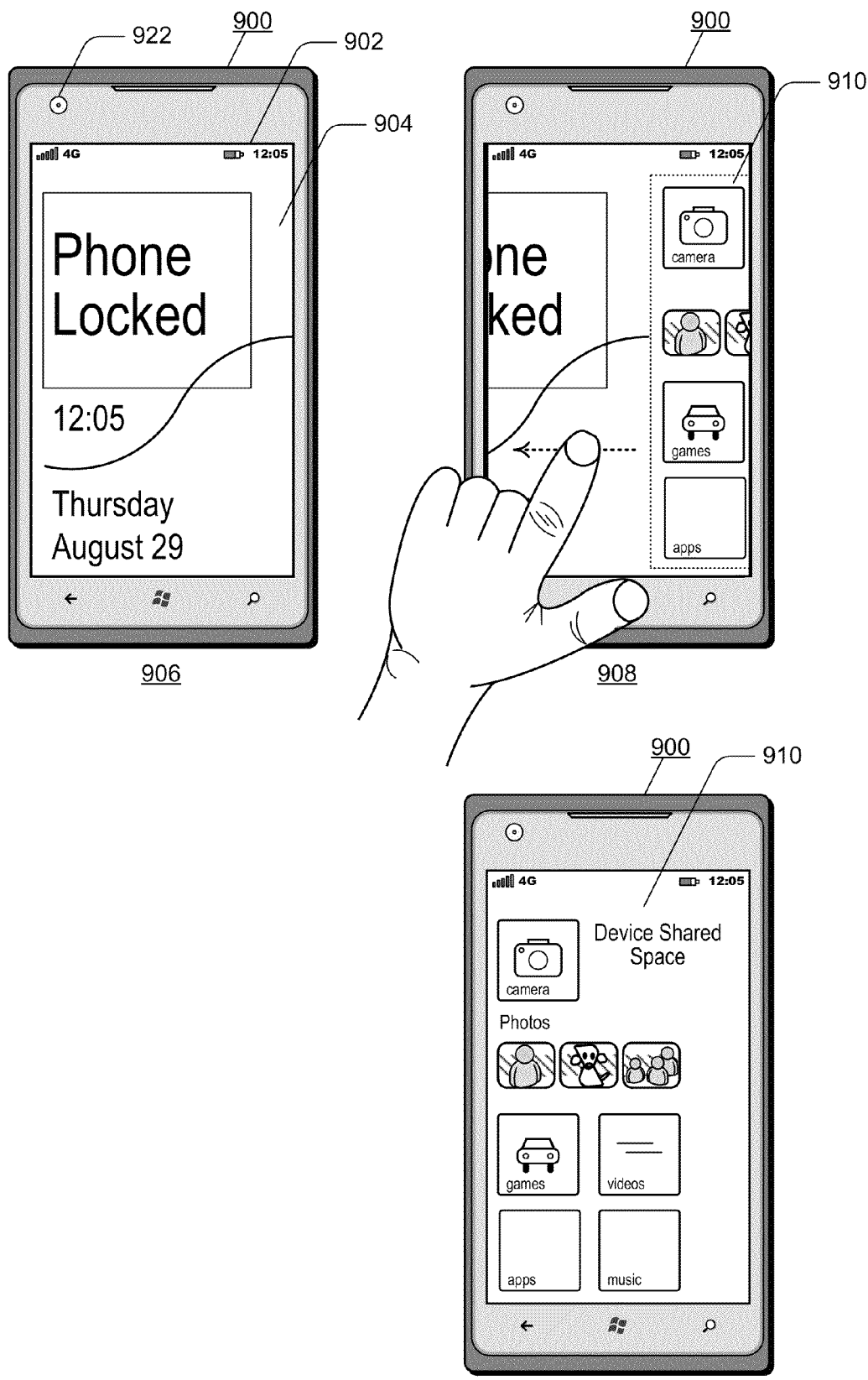
FIG. 9 illustrates an example of restricted execution modes.

FIG. 9 illustrates an example of user interfaces of a restricted execution mode. An example mobile device 900 may be any one or combination of a mobile phone, tablet device, computing device, communication, entertainment, gaming, navigation, and/or other type of portable electronic device. A shared space can be implemented for user access to functionality of device applications without a password, as well as for access to any applications, functions, and features of the mobile device 900 that are designated by the user in the shared space.

The example mobile device 900 includes an integrated display device 902 on which user interfaces can be displayed, such as a device lock screen 904 that indicates the device is locked at 906. For example, a user owner of the mobile device may set-up the device to lock when not in use so that someone else cannot access the full functionality of applications, such as email and text, and/or have access to the Internet via a browser application without providing authentication credentials such as a personal identification number (PIN), login, or other authentication credential.

The user owner of the mobile device 900 can allow another person to use the phone, and hand the phone over without having to unlock the device from the device lock screen 904 by entering a PIN or other credential. As shown in the example 908, a person that has borrowed the phone can swipe the device lock screen with a gesture input to access a shared space user interface 910, which is illustrated at 912 when displayed on the display device, and which provides access to a limited subset of application functionality. The borrower does not enter a PIN or other credential to access the shared space user interface. In implementations, the gesture input may be any type of user and/or gesture input in any direction on the integrated display device 902 of the mobile device. Alternatively or in addition, any type of device, button, and/or gesture inputs may be utilized effective to transition from the device lock screen 904 to the shared space user interface 910.

Restricted execution modes enable implementation of a shared space on a device where a user owner can include device applications that a guest or child can access without requiring a password, and the device applications will be programmatically prevented from being able to access other private device content on the device.

There may be situations when a user owner of a device may want to have access to some content or applications on their mobile phone without unlocking the phone with a PIN code or other authentication credential. Restricted execution modes enable the user owner to make some experiences available without password access, and without compromising the security of sensitive personal or corporate data. In implementations, restricted execution modes allow applications to run, but restricts access to sensitive data or experiences using several mechanisms, such as security capabilities, blocked navigation, and application origin. If an application has a particular security capability, a runtime check is made centrally when the application attempts to access a protected resource, and if the application is running in a restricted execution zone, an error is returned that can be handled by the application. When a device is running in a restricted execution mode, a device application may be referred to as running in a restricted execution "zone".

For the blocked navigation security capability, applications often take advantage of built in tasks to complete user actions like sending an email, making a phone call, etc. When the restricted execution mode is activated on a device, the origination of a device application task at run-time is what is considered to determine whether the device application, and more specifically, whether the task will be allowed. An application task, which is generally synonymous to an application programming interface (or API) call, may include aspects of a data access API call, but it also includes a request to initiate a particular action or actions different than data access, and the task request may incorporate metadata associated with the action of the requested task. The level of functionality is provided on a task-by-task basis to determine whether the action or actions of a requested task will be available in the restricted execution mode during run-time origination of a task request. A device application can be executed by the device, but only some functions of the device application will execute when the restricted execution mode is activated on the device.

Examples of restricting the functionality of a device application may include not permitting the device application to be launched altogether or limiting the device application to calling only a restricted subset of API calls that is narrower than the normal set of API calls available to the application when the mobile device is running in normal user mode. Restricting access to device content also may include disallowing certain API calls that provide access to particular sets of data or content. In many examples, restricting functionality or access does not include analyzing or changing Access Control Lists (ACLs), Access Control Entries (ACEs), or similar file-system access control metadata maintained by a file system. For example, a device application can be restricted from access to device content while a restricted execution mode is activated on a device.

When running in a restricted execution zone, all application requested navigations are screened and only those allowed by the system can continue. Others fail in a backwards compatible way so that legacy applications do not need to be updated to run in the restricted execution zone. For the application origin security capability, only applications that originate and/or have been downloaded from a first-party provider can run (e.g., execute) in a restricted execution mode. This ensures that applications which have not been security checked, and may access sensitive and/or private data on a device, do not run without the user unlocking the device first.

Figure 10:
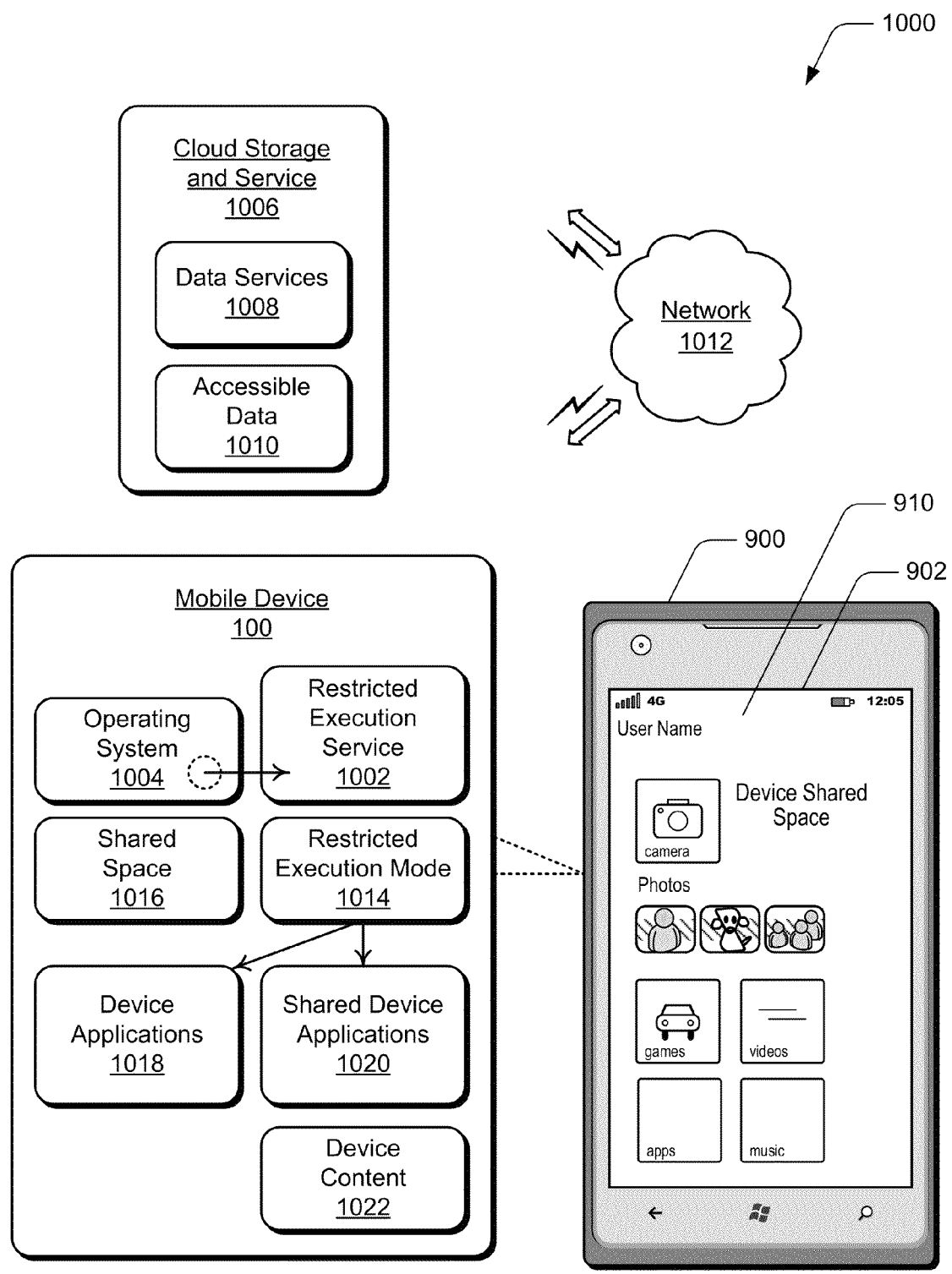
FIG. 10 illustrates an example system in which embodiments of restricted execution modes can be implemented.

FIG. 10 illustrates an example system 1000 in which embodiments of restricted execution modes can be implemented. The example system includes the mobile device 900 as described with reference to FIG. 9, with the integrated display device 902 on which a user interface can be displayed, such as the shared space user interface 910 that is representative of a shared space on the device. Additionally, the mobile device can be implemented with various components, such as a processor and/or memory system, as well as any number and combination of differing components as further described with reference to the example device shown in FIG. 14 to implement embodiments of restricted execution modes.

The mobile device 900 includes a restricted execution service 1002 that can be implemented as a software application (e.g., executable instructions) stored on computer-readable storage media, such as any suitable memory device or electronic data storage. Additionally, the restricted execution service 1002 can be executed with a processing system at the mobile device to implement embodiments of restricted execution modes as described herein. The restricted execution service 1002 may be implemented as an independent device application that is executable on the device to interface with the many applications, features, and functions of the device.

The example system 1000 may also include a cloud storage and service 1006 that can include any type of cloud-based (e.g., network-based) data services 1008 used to store or maintain accessible data 1010 (e.g., data accessible by device applications on the mobile device 900). Any of the devices and services (e.g., implemented as server devices) described herein can communicate via a network 1012, which can be implemented to include a wired and/or a wireless network. The network can also be implemented using any type of network topology and/or communication protocol, and can be represented or otherwise implemented as a combination of two or more networks, to include IP-based networks and/or the Internet. The network may also include mobile operator networks that are managed by a mobile network operator and/or other network operators, such as a communication service provider, mobile phone provider, and/or Internet service provider. Alternatively or in addition, peer-to-peer communication techniques may be utilized, such as multiple devices connected using a peer-to-peer communication network.

The restricted execution service 1002 is implemented to manage a restricted execution mode 1014 of a shared space 1016, such as to limit and/or restrict device applications 1019 and shared device applications 1020 that are included in the shared space 1016 that is accessible without a PIN or authentication credential. The device applications 1019 can include any type of software applications, and the functions and features thereof, that run on the device, such as for user interaction with messaging, gaming, media playback, document viewing, and communication applications. The device applications may also include system-level components that users of a device generally do not access or utilize, but that typically run in the background while the device is operational. The shared device applications can include any subset of the device applications, and are designated as a shared device application when included in the shared space 1016 for limited and/or restricted functionality when a restricted execution mode 1014 is activated on the device.

A user owner of the mobile device 900 can choose the device applications and features, and/or device content, that can be included in the shared space and accessed by a child or guest while the restricted execution mode is activated. Further, a device application may be allowed a restricted level of functionality while running in the shared space (i.e., the application may be executed), yet generally cannot access device content 1022 that is restricted from access, such as contacts, email, and calendar databases, as well as limited access to the device file system.

The content databases, device file system, Internet access, and other device content and features can be protected from device application access when the restricted execution mode is activated. For example, a device application that can access the Internet, email, contacts, etc. when a device is unlocked and operating in a normal user mode will be automatically restricted when the restricted execution mode is activated, such as if the device application has been added to the shared space and is allowed limited functionality in the shared space. As an example, a digital camera application that has been added to the shared space may allow a user to take and view new photos, but previous photos will be restricted from viewing the restricted execution mode is activated on the device.

The shared space user interface 910 of the shared space is customizable by the user owner of the device. For example, the user owner can add applications, such as games and music applications, to the shared space so that the applications are recognized and can be launched in the shared space, perhaps with limited functionality. However applications that are not recognized in the shared space cannot be launched in the shared space. For example, if a game application that is pinned or recognized in the shared space attempts to itself launch a browser application (e.g., as part of the game's execution), the restricted execution service 1002 will check if the browser application is pinned and recognized in the shared space. If the browser application is not recognized in the shared space, then the restricted execution service will fail to launch the application, or if the browser application is recognized, then the browser application can be launched in the shared space by the game application.

As described with reference to FIG. 9, an input can be received, such as a gesture input or device selectable control input, and the restricted execution service 1002 initiates a transition from displaying the device lock screen 904 to display the shared space user interface 910 of the shared space 1016 without receiving a PIN code or other authentication credential entered on the device lock screen. The restricted execution service 1002 is implemented to manage the shared space 1016 when the restricted execution mode 1014 is activated. The restricted execution service 1002 can activate the restricted execution mode 1014 of the mobile device 900, and restrict access of a device application 1018 to the device content 1022, to a file system of the mobile device, and/or to limit the application to a limited set of functionality or tasks while the restricted execution mode is activated.

The shared space 1016 can include a shared device application 1020, and the restricted execution service 1002 can allow the shared device application access to the device content 1022 while the restricted execution mode 1014 is activated. The restricted execution service 1002 can determine whether a device application 1018 is implemented or designed so that a user can designate to allow the device application access to the device content if the device application is included in the shared space 1016 as a shared device application. Alternatively, a device application may be designed as not to be allowed access to the device content even if the device application is included in the shared space. Additionally, this type of a device application may also be implemented as not even being eligible for user-designation to be included in the shared space.

In restricted modes, a configuration of a device application may be designed or programmed to indicate whether the device application is ever to be allowed to run (e.g., execute) in a restricted mode, irrespective of user choice. For example, a confidential corporate application or another application downloaded from a third-party application store that may access private corporate data can be configured to never be allowed to run (e.g., execute) in any restricted mode, even if a user would like it to do so. A configuration of some device applications may be user-controlled to indicate whether the device application is to be allowed to run in a particular restricted mode, such as allowing a subset of games or applications in a kid zone restricted mode, or allowing a subset of camera lens applications to run when the phone is locked.

The restricted execution service 1002 can also be implemented to validate whether or not a given device application can be navigated to regardless of the reason for the navigation request, taking into account the current restricted mode and the target application's system and user configuration. Additionally, a separate navigation stack can be maintained for a normal mode user experience and for the current restricted execution mode. The restricted execution service 1002 is also implemented to allow or disallow migration of applications from the normal mode stack to the restricted mode stack or vice-versa based on scenario needs, and to determine when to close applications on each stack based on available resources and transitions into and out of a restricted mode.

A device application 1018 may initiate a task call to a shared device application 1020 with a request for the device content 1022, and the restricted execution service 1002 can restrict the device application access to the device content via the shared device application while the restricted execution mode 1014 is activated. The device application may also initiate a task call to the operating system 1004 to request device content access, and the restricted execution service can restrict the access to the device content based on one or more device application tasks being designated as restricted while the restricted execution mode is activated.

Alternatively, the device application 1018 can initiate a task call to the shared device application 1020 with a request for the device content 1022, and the request includes a request token that indicates the device application is permitted to access the device content via the shared device application in the shared space 1016. The restricted execution service 1002 can then allow the device application access to the device content via the shared device application based on the request token while the restricted execution mode is activated. The restricted execution service can also deactivate the restricted execution mode 1014 responsive to a PIN code or authentication credential entered on the device lock screen, and return to a normal user mode of the mobile device in which the device application 1018 has unrestricted access to the device content 1022.

The restricted execution service 1000 implements a mechanism to indicate in which restricted modes a device application can run (e.g., execute) based on a task information field of a device application task. The task information field indicates whether a specific task can be allowed to execute in a shared space when the restricted execution mode is activated. This new field will be a bit mask, which a navigation server will use to compare to the navigation filter mask that MobileUI will give to it when a restricted mode is entered. These are marked per task instead of by application because some first-party device applications have tasks that can be allowed to function in a child share space (e.g., Kid's Corner), but not all of the application functionality is allowed while a restricted execution mode is activated on a device. If a device application is allowed to run in a shared space, the restricted execution service can trace an API task call through the application layer from an originator (e.g., device application) that initiates the task call based on a token that is passed along to a core system component that would not otherwise be able to determine whether the task call was originated from a device application running in the shared space. The token can be utilized to determine if the task call is protected from a restricted execution mode.

Figure 11:
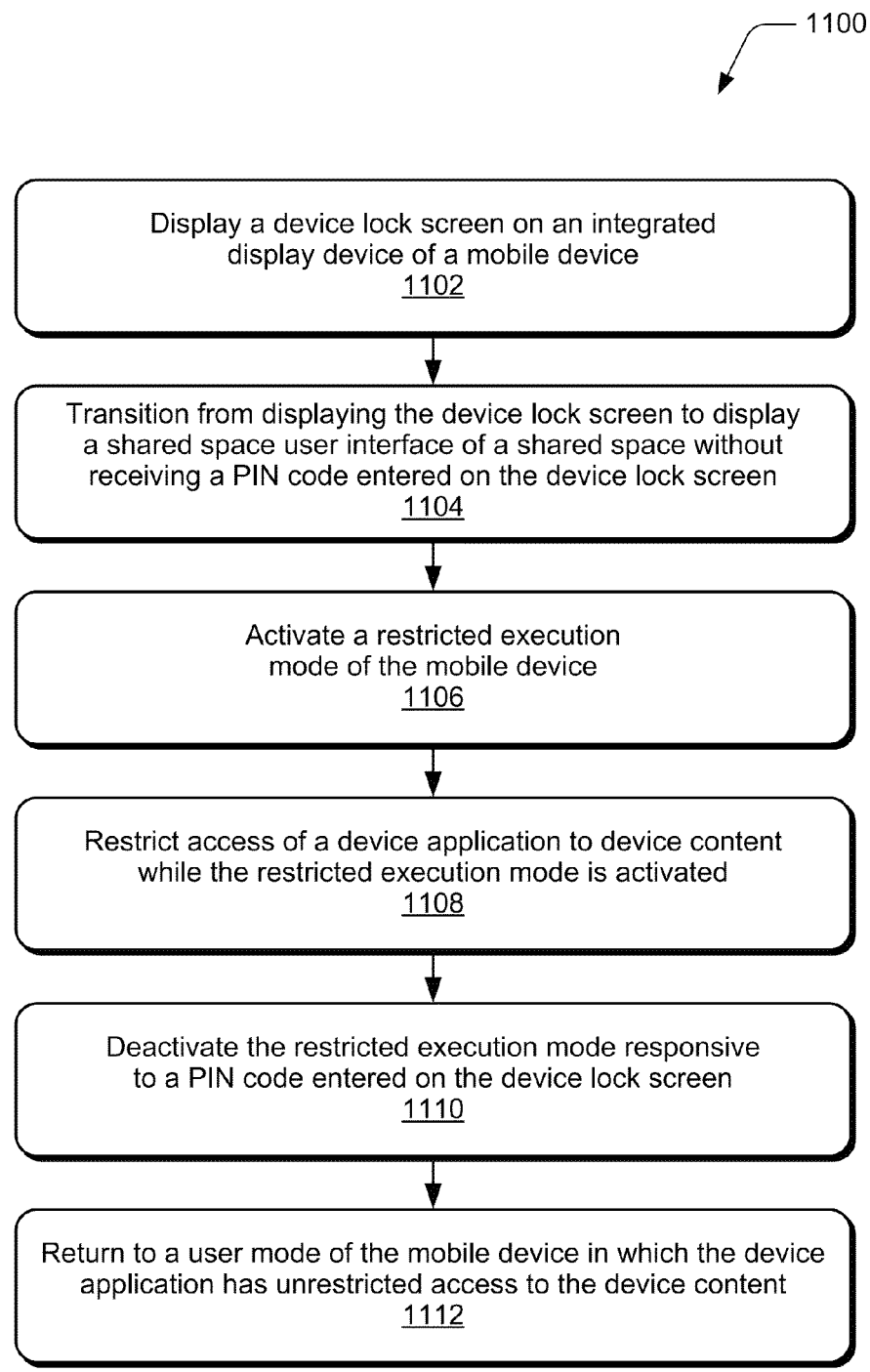
FIG. 11 illustrates example method(s) of restricted execution modes in accordance with one or more embodiments.

FIG. 11 illustrates example method(s) 1100 of restricted execution modes. The order in which the method is described is not intended to be construed as a limitation, and any number or combination of the method operations can be combined in any order to implement a method, or an alternate method.

At 1102, a device lock screen is displayed on an integrated display device of a mobile device. For example, the mobile device 900 (FIG. 9) displays a device lock screen 904 on the integrated display device 902 of the mobile device. At 1104, the display is transitioned from the device lock screen to display a shared space user interface of a shared space without a PIN code or other authentication credential entered on the device lock screen. For example, an input system of the mobile device 900 receives an input, such as a gesture input or device selectable control input, and the input is effective to transition from displaying the device lock screen 904 to display the shared space user interface 910 of a shared space 1016 without a PIN code or other authentication credential entered on the device lock screen.

At 1106, a restricted execution mode of the mobile device is activated. For example, the restricted execution service 1002 at the mobile device 900 activates the restricted execution mode 1014 of the mobile device in response to entering the shared space. At 1108, access of a device application to device content is restricted while the restricted execution mode is activated. For example, the restricted execution service 1002 at the mobile device 900 restricts access of a device application 1018 to the device content 1022 while the restricted execution mode 1014 is activated.

At 1110, the restricted execution mode is deactivated responsive to a PIN code or other authentication credential entered on the device lock screen. For example, the restricted execution service 1002 at the mobile device 900 deactivates the restricted execution mode responsive to a PIN code or other authentication credential entered on the device lock screen. At 1112, the device returns to a user mode of the mobile device in which the device application has unrestricted access to the device content. For example, the restricted execution service 1002 at the mobile device 900 returns to a user mode of the mobile device in which the device application 1018 has unrestricted access to the device content 1022.

Figure 12:
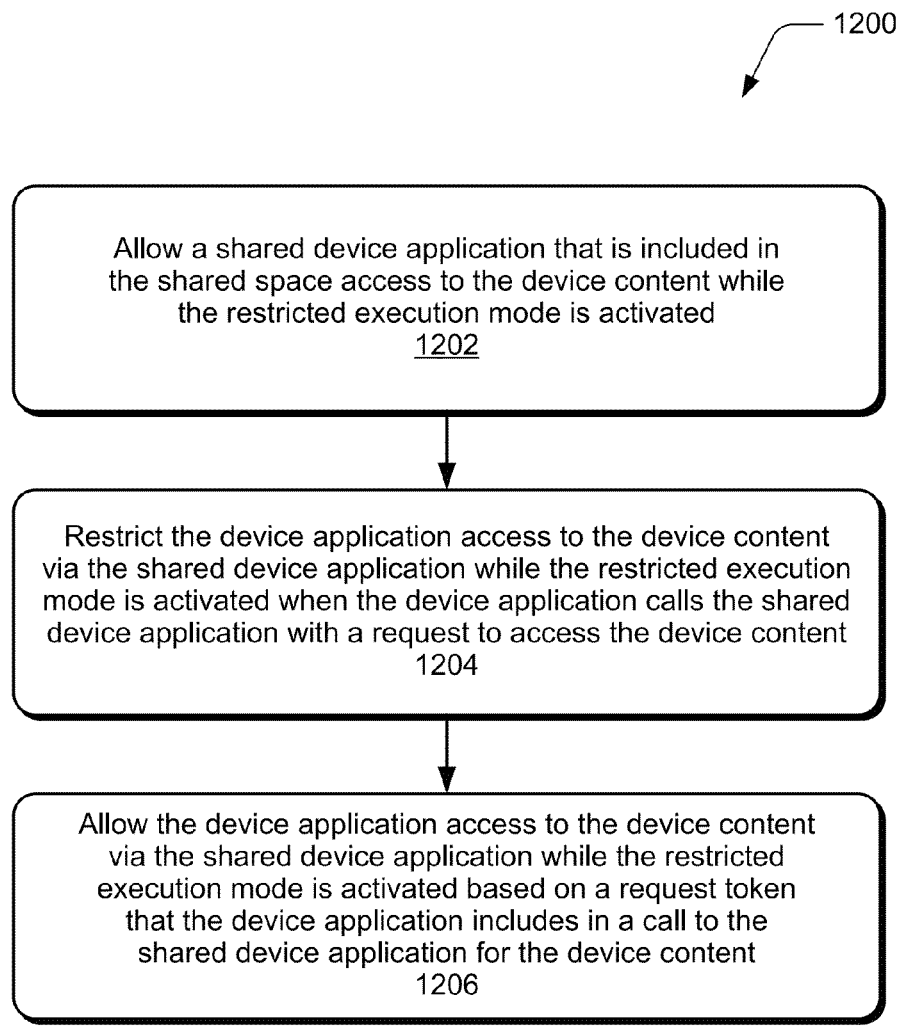
FIG. 12 illustrates example method(s) of restricted execution modes in accordance with one or more embodiments.

FIG. 12 illustrates example method(s) 1200 of restricted execution mode. The order in which the method is described is not intended to be construed as a limitation, and any number or combination of the method operations can be combined in any order to implement a method, or an alternate method.

At 1202, a shared device application that is included in the shared space is allowed access to the device content while the restricted execution mode is activated. For example, the restricted execution service 1002 (FIG. 10) at the mobile device 900 allows access to the device content 1022 to a shared device application 1020 that is included in the shared space 1016 while the restricted execution mode is activated.

At 1204, the device application that requests access to the device content via the shared device application is restricted while the restricted execution mode is activated on the device. For example, restricted execution service 1002 at the mobile device 900 restricts a device application 1018 task call to the shared device application 1020 with a request to access the device content 1022 while the restricted execution mode is activated on the device.

At 1206, the device application is allowed access to the device content via the shared device application while the restricted execution mode is activated based on a request token that the device application includes in a task call to the shared device application for the device content. For example, restricted execution service 1002 at the mobile device 900 allows access to the device content 1022 by the device application 1018 via the shared device application while the restricted execution mode is activated based on a request token that the device application includes in a task call to the shared device application for the device content. The request token indicates that the device application is permitted to access the device content via the shared device application in the shared space.

Figure 13:
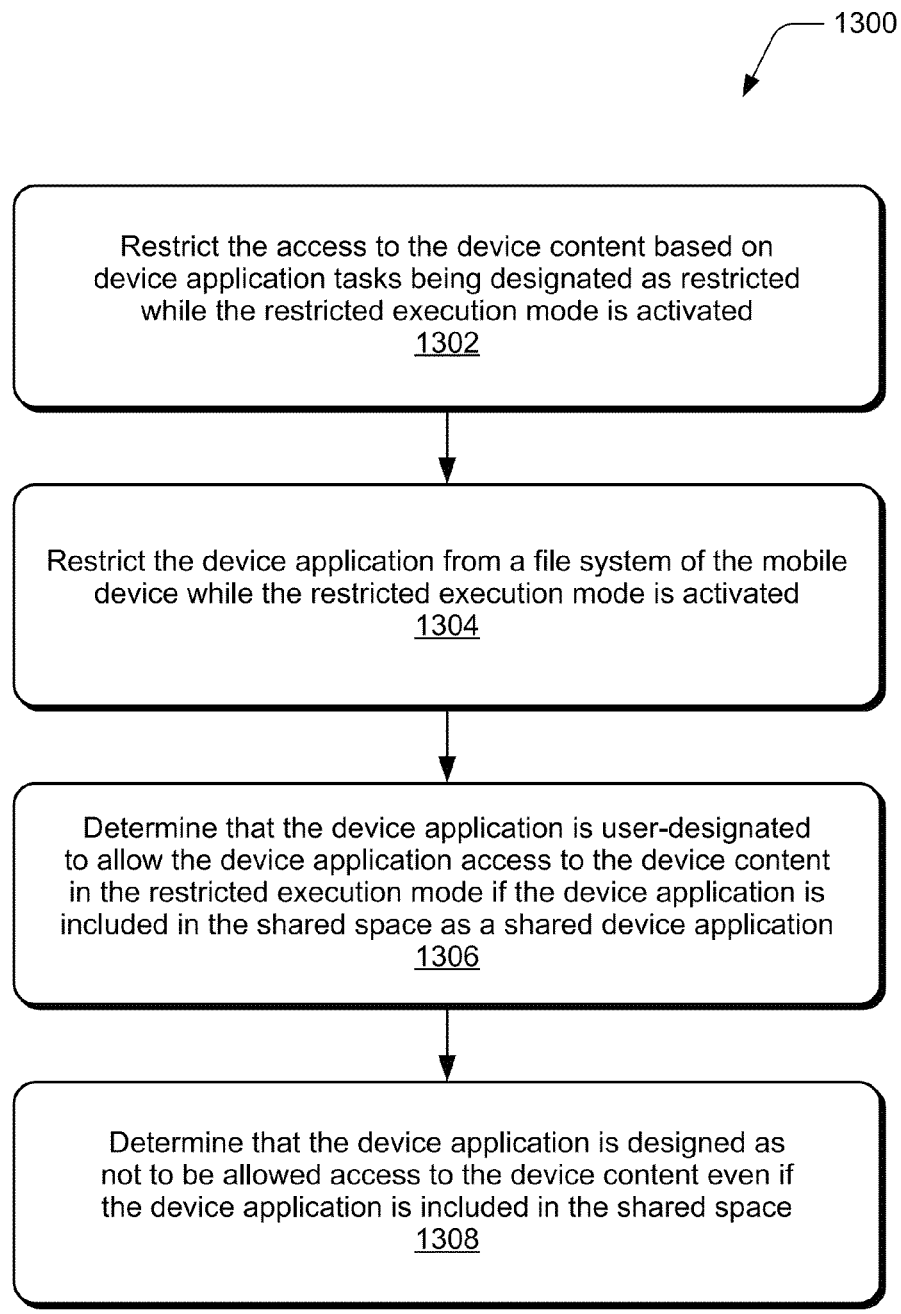
FIG. 13 illustrates example method(s) of restricted execution modes in accordance with one or more embodiments.

FIG. 13 illustrates example method(s) 1300 of restricted execution modes. The order in which the method is described is not intended to be construed as a limitation, and any number or combination of the method operations can be combined in any order to implement a method, or an alternate method.

At 1302, access to the device content is restricted based on device application tasks being designated as restricted while the restricted execution mode is activated, where the device application initiates a task call to access the device content. For example, restricted execution service 1002 (FIG. 10) at the mobile device 900 restricts access to the device content 1022 based on device application tasks being designated as restricted while the restricted execution mode 1014 is activated, where a device application 1018 initiates task calls to access the device content.

At 1304, the device application is restricted from a file system of the mobile device while the restricted execution mode is activated. For example, restricted execution service 1002 at the mobile device 900 restricts a device application 1018 from a file system of the mobile device while the restricted execution mode is activated.

At 1306, the device application is determined as user-designated to allow the device application access to the device content in a restricted execution mode if the device application is included in the shared space as a shared device application. Alternatively, at 1308, the device application is determined as designed as not to be allowed access to the device content even if the device application is included in the shared space. For example, restricted execution service 1002 at the mobile device 900 can determine whether a device application user-designated to allow the device application access to the device content in a restricted execution mode if the device application is included in the shared space as a shared device application. The restricted execution service 1002 may also determine that a device application is designed (e.g., programmed) as not to be allowed access to the device content even if the device application is included in the shared space. Additionally, this type of a programmed device application may also be implemented as not even being eligible for user-designation to be included in the shared space.

Although described herein as a single restricted execution mode, in some examples, a device provides multiple restricted execution modes, such as a first restricted execution mode associated with a child shared space for facilitating sharing a mobile device with a child and a second restricted execution mode associated with a safe driving shared space for facilitating safer driving by a user of a mobile device. These various restricted execution modes may each impose a different set of limitations on the functionality of the device. For example, the child-related execution mode might block access to email data, changes to device settings, or in-app purchases, while the second driving safety restricted execution zone might block graphical user interfaces that could distract a driver from the road.

From the lock screen displayed on a device, without entering a PIN or other authentication credentials, a user may be able to reach different shared spaces, each of which has a different restricted execution mode associated with it. For example, from the lock screen, a user might enter a first gesture (e.g., a left swipe) to reach a first shared space having a first restricted execution mode and a second different gesture (e.g., a right swipe) to reach a second, different shared space having a second restricted execution mode. In some examples, a shared space associated with a restricted execution mode may be accessed from different entry points than receiving an input (e.g., a gesture input) on the lock screen.

Figure 14:
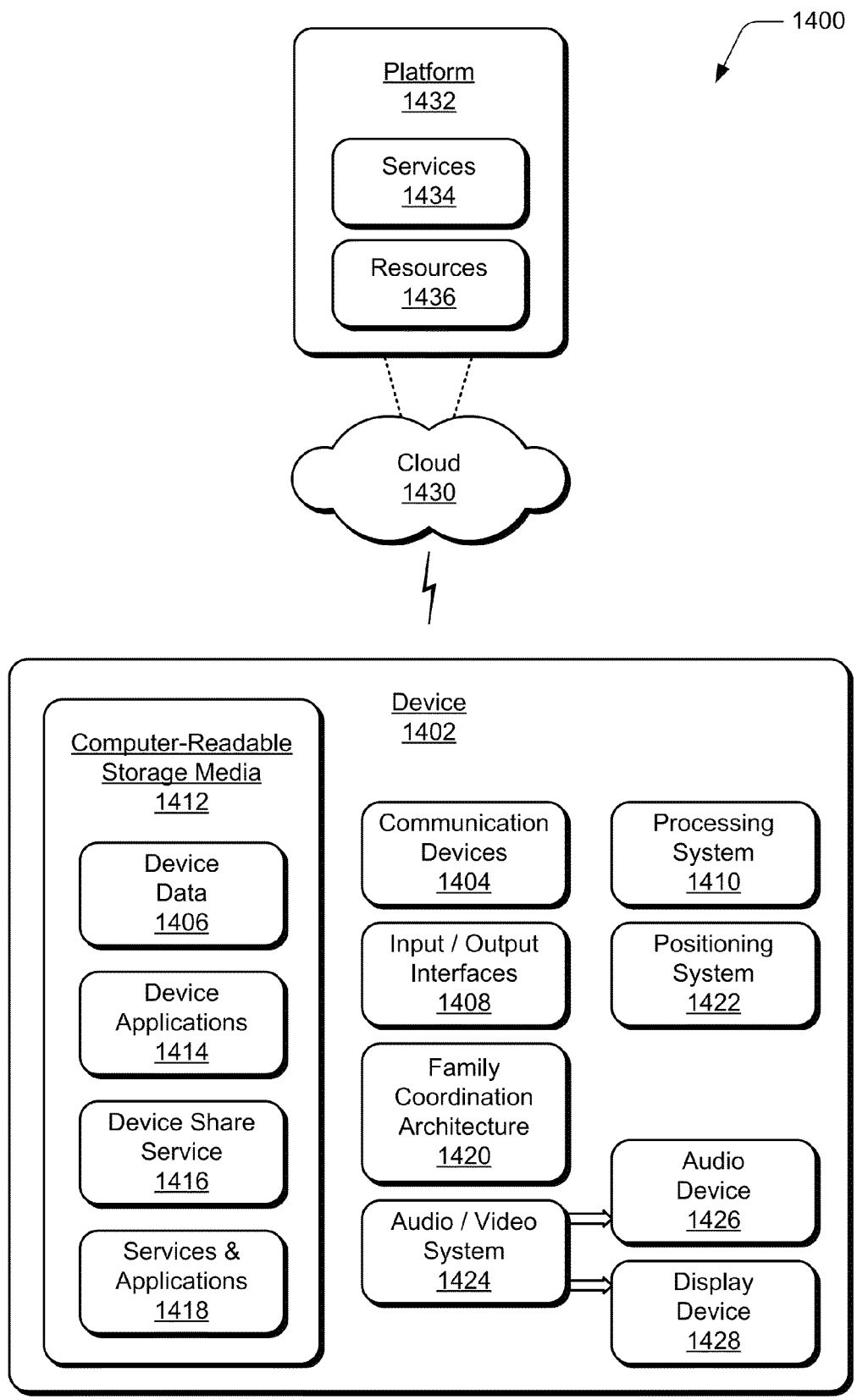
FIG. 14 illustrates an example system with an example device that can implement embodiments of mobile device child share.

FIG. 14 illustrates an example system 1400 that includes an example device 1402, which can implement embodiments of mobile device child share. The example device 1402 can be implemented as any of the devices, services, and/or servers described with reference to the previous FIGS. 1-13, such as any type of client or mobile device, mobile phone, tablet, computing, communication, entertainment, gaming, media playback, and/or other type of device. For example, the mobile device 100 shown in FIGS. 1-2, and the mobile device 900 shown in FIGS. 9 and 10, may be implemented as the example device 1402.

The device 1402 includes communication devices 1404 that enable wired and/or wireless communication of device data 1406, such as media content and the shared messages, updates, and events data at the device. The media content can include any type of audio, video, and/or image data. The communication devices 1404 can also include transceivers for cellular phone communication and/or for network data communication.

The device 1402 also includes input/output (I/O) interfaces 1408, such as data network interfaces that provide connection and/or communication links between the device, data networks, and other devices. The I/O interfaces can be used to couple the device to any type of components, peripherals, and/or accessory devices. The I/O interfaces also include data input ports via which any type of data, media content, and/or inputs can be received, such as user inputs to the device, as well as any type of audio, video, and/or image data received from any content and/or data source.

The I/O interfaces 1408 also support natural user interface (NUI) inputs to the device 1402, such as any interface technology that enables a user to interact with a device in a "natural" manner, free from artificial constraints imposed by input devices such as mice, keyboards, remote controls, and the like. Examples of natural user interface inputs may rely on speech recognition, touch and stylus recognition, gesture recognition on-screen and motion gesture recognition proximate the device, head, eye, and environment recognition and tracking, augmented reality and virtual reality systems, and any other type of audible, vision, touch, gesture, and/or machine intelligence that may determine user input intentions.

The device 1402 includes a processing system 1410 that may be implemented at least partially in hardware, such as with any type of microprocessors, controllers, and the like that process executable instructions. The processing system can include components of an integrated circuit, programmable logic device, a logic device formed using one or more semiconductors, and other implementations in silicon and/or hardware, such as a processor and memory system implemented as a system-on-chip (SoC). Alternatively or in addition, the device can be implemented with any one or combination of software, hardware, firmware, or fixed logic circuitry that may be implemented with processing and control circuits. The device 1402 may further include any type of a system bus or other data and command transfer system that couples the various components within the device. A system bus can include any one or combination of different bus structures and architectures, as well as control and data lines.

The device 1402 also includes computer-readable storage media 1412, such as data storage devices that can be accessed by a computing device, and that provide persistent storage of data and executable instructions (e.g., software applications, programs, functions, and the like). Examples of computer-readable storage media include volatile memory and non-volatile memory, fixed and removable media devices, and any suitable memory device or electronic data storage that maintains data for computing device access. The computer-readable storage media can include various implementations of random access memory (RAM), read-only memory (ROM), flash memory, and other types of storage media in various memory device configurations.

Generally, computer-readable storage media is representative of media and/or devices that enable persistent and/or non-transitory storage of data in contrast to mere signal transmission, carrier waves, or signals per se. A computer-readable signal media may refer to a signal-bearing medium that transmits instructions, such as via a network. The signal media can embody computer-readable instructions as data in a modulated data signal, such as carrier waves or other transport mechanism.

The computer-readable storage media 1412 provides storage of the device data 1406 and various device applications 1414, such as an operating system that is maintained as a software application with the computer-readable storage media and executed by the processing system 1410. In this example, the device applications also include a device share service 1416 that implements embodiments of mobile device child share, such as when the example device 1402 is implemented as the mobile device 100 shown in FIG. 1. An example of the device share service 1416 is the device share service 202 that is integrated with the operating system 204 at the mobile device 100, as described with reference to FIGS. 1 and 2.

The device applications 1414 can also include any of the services and applications 1418 that implement embodiments of mobile device child share. The example device 1402 also includes a family coordination architecture 1420, which may be implemented in the general context of software, firmware, hardware (e.g., fixed logic circuitry), or any combination thereof to support embodiments of mobile device child share and/or mobile devices family coordination. The device 1402 can also include a positioning system 1422, such as a GPS transceiver, or similar positioning system components, that can be utilized to determine a global or navigational position of the device.

The device 1402 also includes an audio and/or video system 1424 that generates audio data for an audio device 1426 and/or generates display data for a display device 1428. The audio device and/or the display device include any devices that process, display, and/or otherwise render audio, video, display, and/or image data. In implementations, the audio device and/or the display device are integrated components of the example device 1402. Alternatively, the audio device and/or the display device are external, peripheral components to the example device.

In embodiments, at least part of the techniques described for mobile device child share may be implemented in a distributed system, such as over a "cloud" 1430 in a platform 1432. The cloud 1430 includes and/or is representative of the platform 1432 for services 1434 and/or resources 1436. For example, the services 1434 may include the cloud storage and service 206, and any of the data services 208 as described with reference to FIG. 2. Additionally, the resources 1436 may include the child share profiles 210 as described with reference to FIG. 2.

The platform 1432 abstracts underlying functionality of hardware, such as server devices (e.g., included in the services 1434) and/or software resources (e.g., included as the resources 1436), and connects the example device 1402 with other devices, servers, etc. The resources 1436 may also include applications and/or data that can be utilized while computer processing is executed on servers that are remote from the example device 1402. Additionally, the services 1434 and/or the resources 1436 may facilitate subscriber network services, such as over the Internet, a cellular network, or Wi-Fi network. The platform 1432 may also serve to abstract and scale resources to service a demand for the resources 1436 that are implemented via the platform, such as in an interconnected device embodiment with functionality distributed throughout the system 1400. For example, the functionality may be implemented in part at the example device 1402 as well as via the platform 1432 that abstracts the functionality of the cloud 1430.

Although embodiments of mobile device child share have been described in language specific to features and/or methods, the appended claims are not necessarily limited to the specific features or methods described. Rather, the specific features and methods are disclosed as example implementations of mobile device child share.

The invention claimed is:

1. A mobile device, comprising:
    an input system configured to receive a first input effective to transition the mobile device from a default device lock screen to a different lock screen, the input system further configured to receive a second input effective to transition from the different lock screen to a restricted mode that is configured to restrict functionality of the mobile device;
    a display device configured to display, respectively, the default device lock screen, the different lock screen, and a screen of the restricted mode;
    a processing system to implement a device share service that is configured to:
        initiate a display associated with the restricted mode without an identifier code entered on the default device lock screen and without an identifier code entered on the different lock screen;
        activate the restricted mode that restricts functionality of at least one of device applications or access to device content based on designated restriction limits;
        receive an input to a selectable control of the mobile device;
        deactivate the restricted mode responsive to the input to the selectable control;
        reinitiate the display of the default device lock screen; and
        restore audio settings of the mobile device to volume levels that were designated prior to activation of the restricted mode.

2. A mobile device as recited in claim 1, further comprising:
    capacitive device input buttons configured to receive user input to initiate device functions; and wherein
    the device share service is further configured to deactivate the capacitive device input buttons in the restricted mode.

3. A mobile device as recited in claim 1, wherein the device share service is configured to restrict an incoming voice call during the restricted mode.

4. A mobile device as recited in claim 1, wherein the device share service is configured to:
    allow access to a device camera application to capture digital photos; and
    restrict an upload of the digital photos to cloud storage during the restricted mode.

5. A mobile device as recited in claim 1, wherein the device share service is configured to provide an audible indication of an incoming voice call through an integrated speaker of the mobile device while a headset different than the integrated speaker is connected to a headset port of the mobile device during the restricted mode.

6. A mobile device as recited in claim 1, wherein the device selectable control comprises the power button of the mobile device.

7. A mobile device as recited in claim 1, wherein the device share service is configured to:
    activate the restricted mode based on a profile that comprises application functionality restriction settings and content access restriction settings.

8. A system comprising:
    one or more processors; and
    one or more memories, coupled to the one or more processors, comprising instructions for a device share service executable by the one or more processors to configure the device share service to:
        receive a first input effective to transition a mobile device from a default device lock screen to a different lock screen,
        receive a second input effective to transition from the different lock screen to a restricted mode that is configured to restrict functionality of the system;
        initiate a display associated with the restricted mode without an identifier code entered on the default device lock screen and without an identifier code entered on the different lock screen;
        activate the restricted mode that restricts functionality of at least one of mobile device applications or access to mobile device content based on designated restriction limits;
        receive an input to a selectable control of the mobile device;
        deactivate the restricted mode responsive to the input to the selectable control;

reinitiate the display of the default device lock screen; and restore audio settings of the mobile device to volume levels that were designated prior to activation of the restricted mode.

9. A system as recited in claim 8, wherein the mobile device comprises capacitive device input buttons configured to receive user input to initiate mobile device functions, the instructions of the device sharing service configured to:

deactivate the capacitive device input buttons in the restricted mode.

10. A system as recited in claim 8, wherein the device share service is configured to restrict an incoming voice call during the restricted mode.

11. A system as recited in claim 8, wherein the device share service is configured to:

allow access to a device camera application to capture digital photos; and restrict an upload of the digital photos to cloud storage during the restricted mode.

12. A system as recited in claim 8, wherein the device share service is configured to provide an audible indication of an incoming voice call through an integrated speaker of the mobile device while a headset different than the integrated speaker is connected to a headset port of the mobile device during the restricted mode.

13. A system as recited in claim 8, wherein the device selectable control comprises a power button of the mobile device.

14. A system as recited in claim 8, wherein the device share service is configured to:

activate the restricted mode based on a profile that comprises application functionality restriction settings and content access restriction settings.

15. A method, comprising:

receiving a first input, at a mobile device, effective to transition the mobile device from a default device lock screen to a different lock screen, receiving a second input effective to transition from the different lock screen to a restricted mode that is configured to restrict functionality of the system;

initiating a display associated with the restricted mode without an identifier code entered on the default device lock screen and without an identifier code entered on the different lock screen;

activating the restricted mode that restricts functionality of at least one of mobile device applications or access to mobile device content based on designated restriction limits;

receiving an input to a selectable control of the mobile device;

deactivating the restricted mode responsive to the input to the selectable control;

reinitiating the display of the default device lock screen; and restoring audio settings of the mobile device to volume levels that were designated prior to activation of the restricted mode.

16. A method as recited in claim 15, wherein the mobile device comprises capacitive device input buttons configured to receive user input to initiate device functions, the method further comprising:

deactivating the capacitive device input buttons in the restricted mode.

17. A method as recited in claim 15, further comprising:
restricting an incoming voice call during the restricted mode.

18. A method as recited in claim 15, the method further comprising:

allowing access to a device camera application to capture digital photos; and restricting an upload of the digital photos to cloud storage during the restricted mode.

19. A method as recited in claim 15, the method further comprising:

providing an audible indication of an incoming voice call through an integrated speaker of the mobile device while a headset different than the integrated speaker is connected to a headset port of the mobile device during the restricted mode.

20. A method as recited in claim 15, the method further comprising:

activating the restricted mode based on a profile that comprises application functionality restriction settings and content access restriction settings.

* * * * *